United States Patent
Lee et al.

(10) Patent No.: US 10,952,046 B2
(45) Date of Patent: Mar. 16, 2021

(54) METHOD AND APPARATUS FOR SUPPORTING VEHICLE COMMUNICATIONS IN 5G SYSTEM

(71) Applicant: Samsung Electronics Co., Ltd., Suwon-si (KR)

(72) Inventors: Hoyeon Lee, Suwon-si (KR); Sunghoon Kim, Suwon-si (KR); Youngkyo Baek, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/377,061

(22) Filed: Apr. 5, 2019

(65) Prior Publication Data

US 2019/0313359 A1 Oct. 10, 2019

(30) Foreign Application Priority Data

| Apr. 5, 2018 | (KR) | 10-2018-0039902 |
| May 21, 2018 | (KR) | 10-2018-0057774 |
| Jun. 26, 2018 | (KR) | 10-2018-0073423 |

(51) Int. Cl.
*H04W 4/40* (2018.01)
*H04W 60/00* (2009.01)
(Continued)

(52) U.S. Cl.
CPC ........... *H04W 4/40* (2018.02); *H04L 41/0893* (2013.01); *H04W 4/42* (2018.02); *H04W 4/70* (2018.02);
(Continued)

(58) Field of Classification Search
CPC ....... H04W 60/04; H04W 76/15; H04W 4/42; H04W 4/40; H04W 4/44; H04W 4/46; H04W 4/48; H04L 41/0893
See application file for complete search history.

(56) References Cited

U.S. PATENT DOCUMENTS

| 2019/0037448 A1* | 1/2019 | Shan ................ H04W 36/0016 |
| 2019/0150082 A1* | 5/2019 | Kedalagudde ........... G08G 1/22 |
| 2019/0230645 A1* | 7/2019 | Cheng ..................... H04L 45/24 |

FOREIGN PATENT DOCUMENTS

| KR | 10-2018-0039512 A | 4/2018 |
| WO | 2017/189035 A1 | 11/2017 |

OTHER PUBLICATIONS

USPTO Office Action regarding U.S. Appl. No. 16/377,043, dated Jan. 10, 2020, 16 pages.

(Continued)

*Primary Examiner* — Marcus Hammonds

(57) ABSTRACT

Provided are a communication method and system that combine the 5G communication system and the IoT technology to support a higher data rate after the 4G system. Based on the 5G communication technology and IoT technology, the disclosure can be applied to various intelligent services (e.g., smart home, smart building, smart city, smart or connected, car, healthcare, digital education, retail business, and security and safety service). The disclosure relates to a method and apparatus for terminating a cellular network connection to a terminal without authentication. The disclosure relates to a method and system for providing a vehicle communication service in the 3GPP system.

12 Claims, 26 Drawing Sheets

| Service type | V2X service ID (e.g. PSID or ITS-AID) | RAT type |
|---|---|---|
| Basic Safety Message service | 0 | LTE |
| Event Notification Message service | 1 | NR |
| Extended Sensors service | 2 | LTE, NR |
| Platooning service | 3 | NR |
| Remote Driving service | 4 | Uu |

(51) Int. Cl.
*H04W 4/70* (2018.01)
*H04W 4/42* (2018.01)
*H04W 76/15* (2018.01)
*H04L 12/24* (2006.01)
*H04W 60/04* (2009.01)
*H04W 88/06* (2009.01)

(52) U.S. Cl.
CPC ......... *H04W 60/005* (2013.01); *H04W 60/04* (2013.01); *H04W 76/15* (2018.02); *H04W 88/06* (2013.01)

(56) References Cited

OTHER PUBLICATIONS

"3rd Generation Partnership Project; Technical Specification Group Services and System Aspects; Architecture enhancements for V2X services (Release 15)", GGPP TS 23.285 V15.0.0 (Mar. 2018), 36 pages.

Huawei, HiSilicon, "Solution to Key Issue #5: Service Provisioning to UE for eV2X communications", SA WG2 Meeting #126, Feb. 26-Mar. 2, 2018, S2-182252, 7 pages.

ZTE, "5GS eV2X architecture discussion and proposal", SA WG2 Meeting #126, Feb. 26-Mar. 2, 2018, S2-182168, 3 pages.

Huawei, HiSilicon, "Clarifications on Key Issue #7: Network Slicing for eV2X Services and initial solution", SA WG2 Meeting #126, Feb. 26-Mar. 2, 2018, S2-181949, 3 pages.

International Search Report dated Jul. 22, 2019 in connection with International Patent Application No. PCT/KR2019/004055, 3 pages.

Written Opinion of the International Searching Authority dated Jul. 22, 2019 in connection with International Patent Application No. PCT/KR2019/004055, 5 pages.

Notification of the Non-Final Office Action in connection with Co-Pending U.S. Appl. No. 16/377,043 dated Jul. 24, 2020, 14 pages.

* cited by examiner

FIG. 7

| Slice/Service type | SST value | Characteristics |
|---|---|---|
| V2X | 101 | Slice suitable for the handling of V2X services |
| V2N | 102 | Slice suitable for the handling of V2N services |
| V2I | 103 | Slice suitable for the handling of V2I services |
| V2V | 104 | Slice suitable for the handling of V2V services |
| V2P | 105 | Slice suitable for the handling of V2P services |

| S-NSSAI indicating V2X slice | SST value | SD value |
|---|---|---|
| S-NSSAI for V2X | 101 | (optional) |
| S-NSSAI for V2N | 102 | (optional) |
| S-NSSAI for V2I | 103 | (optional) |
| S-NSSAI for V2V | 104 | (optional) |
| S-NSSAI for V2P | 105 | (optional) |

FIG. 9

| Service type | V2X service ID (e.g. PSID or ITS-AID) | RAT type |
|---|---|---|
| Basic Safety Message service | 0 | LTE |
| Event Notification Message service | 1 | NR |
| Extended Sensors service | 2 | LTE, NR |
| Platooning service | 3 | NR |
| Remote Driving service | 4 | Uu |

FIG. 15

| Service type | V2X service ID (e.g. PSID or ITS-AID) | Frequency |
|---|---|---|
| Basic Safety Message service | 0 | 1~100 MHz |
| Event Notification Message service | 1 | 100~200 MHz |
| Extended Sensors service | 2 | 5.9 GHz |
| Platooning service | 3 | 5.9 GHz |
| Remote Driving service | 4 | Uu |

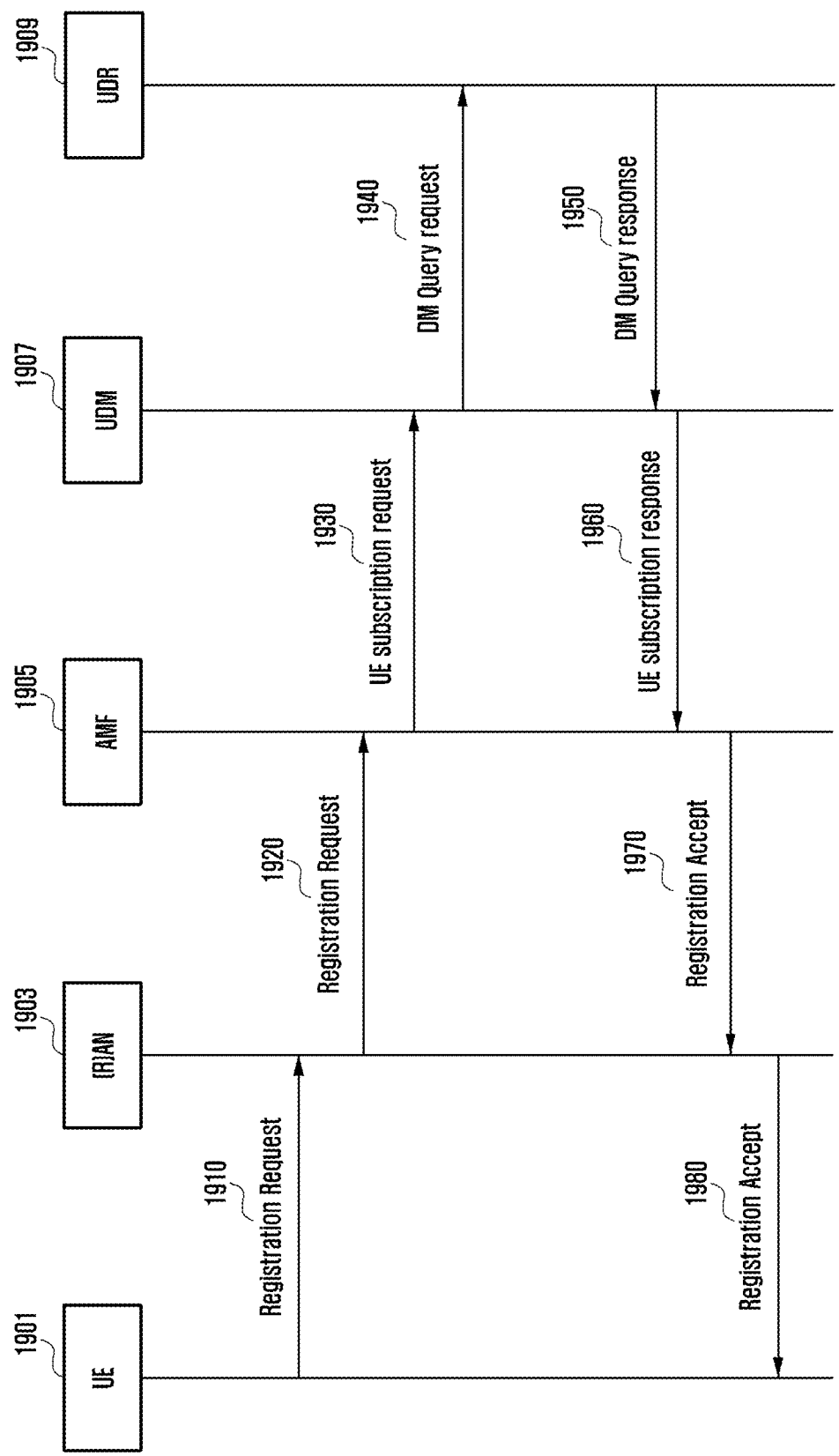

METHOD AND APPARATUS FOR SUPPORTING VEHICLE COMMUNICATIONS IN 5G SYSTEM

CROSS-REFERENCE TO RELATED APPLICATIONS

This application is based on and claims priority under 35 U.S.C. 119(a) to Korean Patent Application No. 10-2018-0039902 filed on Apr. 5, 2018, Korean Patent Application No. 10-2018-0057774 filed on May 21, 2018, and Korean Patent Application No. 10-2018-0073423 filed on Jun. 26, 2018 in the Korean Intellectual Property Office, the disclosures of which are herein incorporated by reference in their entirety. The present application is related to U.S. application Ser. No. 16/377,043 filed Apr. 5, 2019 and entitled "METHOD AND APPARATUS FOR SUPPORTING VEHICLE COMMUNICATIONS IN 5G SYSTEM," which is incorporated by reference herein.

BACKGROUND

1. Field

The disclosure relates to a method for providing a vehicle communication (vehicle-to-everything, V2X) service in a 5G mobile communication system.

2. Description of Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

The 5G system aims to support a wider variety of services than the existing 4G system. For example, the representative services may include enhanced mobile broadband (eMBB), ultra-reliable and low-latency communication (URLLC), massive machine type communication (mMTC), and evolved multimedia broadcast/multicast service (eMBMS). The system providing the URLLC service may be referred to as a URLLC system, the system providing the eMBB service may be referred to as an eMBB system, or the like. The terms "service" and "system" may be used interchangeably.

Among them, the URLLC service is a newly considered service in the 5G system and, unlike the existing 4G system, requires satisfaction of extremely high reliability (e.g., packet error rate of about $10^{-5}$) and low latency (e.g., about 0.5 msec) compared with other services. To satisfy such strict requirements, it may be necessary to apply a shorter transmission time interval (TTI) to the URLLC service in comparison to the eMBB service. Various techniques utilizing short TTIs are being considered.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

V2X (vehicle-to-everything) is a general term indicating all types of communication techniques applicable to road vehicles, and is being applied to various supplementary services in addition to the initial safety use case along with the development of wireless communication technology.

As a V2X service providing technology, WAVE (wireless access in vehicular environments) specifications have been standardized based on IEEE 802.11p and IEEE P1609. However, WAVE as a dedicated short range communication (DSRC) technology has a limitation in the message transmission range between vehicles.

To overcome such a limitation, the cellular-based V2X technology standard is underway in 3GPP. The LTE-based 4G V2X standard has been completed in Release 14, and the NR-based 5G V2X standard is underway in Release 16.

SUMMARY

Accordingly, the disclosure defines a 5G-based V2X system architecture. The disclosure also defines a V2X network slice structure for providing V2X services. In addition, the disclosure defines a method for providing provisioning information to a terminal for a V2X service in the 5G V2X system.

Aspects, features or objects of the disclosure are not limited to those described above. Other aspects, advantages, and salient features of the disclosure will become apparent to those skilled in the art from the following description.

In accordance with an aspect of the present disclosure, a method of a terminal in a wireless communication system is provided. The method comprises receiving, from an access and mobility management function (AMF), mapping information regarding mapping between at least one vehicle to everything (V2X) service type and at least one radio access technology (RAT) type; determining at least one RAT type corresponding to a V2X message to be transmitted, based on the mapping information; and transmitting the V2X message using the determined at least on RAT type.

In one embodiment, the transmitting the V2X message comprises: transmitting the V2X message using at least one of a long term evolution (LTE) RAT or a next generation (NR) RAT, in case that the determined at least on RAT type corresponding to the V2X message is the LTE RAT and the NR RAT.

In one embodiment, the receiving the mapping information comprises: transmitting, to the AMF, a registration request message; and receiving, from the AMF, a registration response message including the mapping information received from a policy control function (PCF) stored in a user data repository (UDR), in response to the registration request message.

In one embodiment, the determining the at least one RAT type is performed by a V2X layer of the terminal.

In one embodiment, the receiving the mapping information comprises: receiving, from the AMF, a user equipment (UE) configuration update message including the mapping information, in case that a UE policy update is triggered by a policy control function (PCF).

The present disclosure also provides a method of an access and mobility management function (AMF) in a wireless communication system. The method comprises receiving, from a policy control function (PCF), mapping information regarding mapping between at least one vehicle to everything (V2X) service type and at least one radio access technology (RAT) type; and transmitting, to a terminal, the mapping information for the terminal to determine at least one RAT type corresponding to a V2X message to be transmitted and transmit the V2X message using the determined at least on RAT type.

In one embodiment, the receiving the mapping information comprises: receiving, from the terminal, a registration request message; transmitting, to the PCF, a policy request message; and receiving, from the PCF, a policy response message including the mapping information received from a user data repository (UDR), and the transmitting the mapping information comprises transmitting, to the terminal, a registration response message including the mapping information.

In one embodiment, the receiving the mapping information comprises receiving, from the PCF, a policy update message including the mapping information, in case that a UE policy update is triggered by a policy control function (PCF), and the transmitting the mapping information comprises transmitting, to the terminal, a user equipment (UE) configuration update message including the mapping information.

The present disclosure also provides a terminal comprising a transceiver; and a controller coupled with the transceiver and configured to: receive, from an access and mobility management function (AMF), mapping information regarding mapping between at least one vehicle to everything (V2X) service type and at least one radio access technology (RAT) type, determine at least one RAT type corresponding to a V2X message to be transmitted, based on the mapping information, and transmit the V2X message using the determined at least on RAT type.

The present disclosure also provides an AMF comprising a transceiver; and a controller coupled with the transceiver and configured to: receive, from a policy control function (PCF), mapping information regarding mapping between at least one vehicle to everything (V2X) service type and at least one radio access technology (RAT) type, and transmit, to a terminal, the mapping information for the terminal to determine at least one RAT type corresponding to a V2X message to be transmitted and transmit the V2X message using the determined at least on RAT type.

According to an embodiment of the disclosure, a vehicle terminal can utilize a vehicle communication service provided by the 5G V2X system. Here, the vehicle terminal may be a device embedded in the vehicle, or may be a terminal attached to the vehicle such as a smartphone or a dashboard camera.

According to an embodiment of the disclosure, the V2X application server (AS) provides the V2X service provisioning information to the terminal, making the roaming interface between the V2X control functions defined in the LTE V2X system unnecessary. In addition, the method of causing the V2X AS to provide the service provisioning information is applicable to other vertical services other than V2X.

According to an embodiment of the disclosure, by defining the V2X network slice, a third party service provider other than the mobile network operator can provide the V2X network slice. Here, examples of the third party service provider may include a vehicle manufacturer or a terminal manufacturer. Also, a third party service provider may rent the V2X network slice from the mobile network operator to utilize the V2X network slice. That is, the mobile network operator may install, operate, and manage the V2X network slice, and a third party service provider may rent the V2X network slice from the mobile network operator for utilization.

According to an embodiment of the disclosure, the V2X service provider (SP) can provide 5G-specific services.

Features or advantages of the disclosure are not limited to those described above. Other advantages and salient features of the disclosure will become apparent to those skilled in the art from the following description.

BRIEF DESCRIPTION OF THE DRAWINGS

FIG. 7 shows examples of S-NSSAIs indicating V2X service characteristics and V2X slices according to an embodiment of the disclosure;

FIG. 9 shows an example of a mapping between V2X services and RAT types according to an embodiment of the disclosure;

FIG. 15 shows an example of a mapping between V2X services and frequency bands according to an embodiment of the disclosure;

FIG. 19 depicts a procedure for V2X service authentication according to an embodiment of the disclosure;

DETAILED DESCRIPTION

Hereinafter, embodiments and operations of the disclosure are described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the following description, the terms for identifying or indicating access nodes, network entities, messages, interfaces between network entities, and various types of identification information are illustrated for ease of explanation. Hence, the disclosure is not limited to the following terms, and different terms referring to objects having equivalent technical meanings can be used.

In the description, the terms and names defined in the standards for the 5G system are used for ease of explanation. However, the disclosure is not limited by those terms and names, and can also be applied to systems conforming to other standards.

The following description of the embodiments is focused on 3GPP communication standards. However, it should be understood by those skilled in the art that the subject matter of the disclosure is applicable to other communication systems having similar technical backgrounds without significant modifications departing from the scope of the disclosure.

Embodiment A

Figure 1:
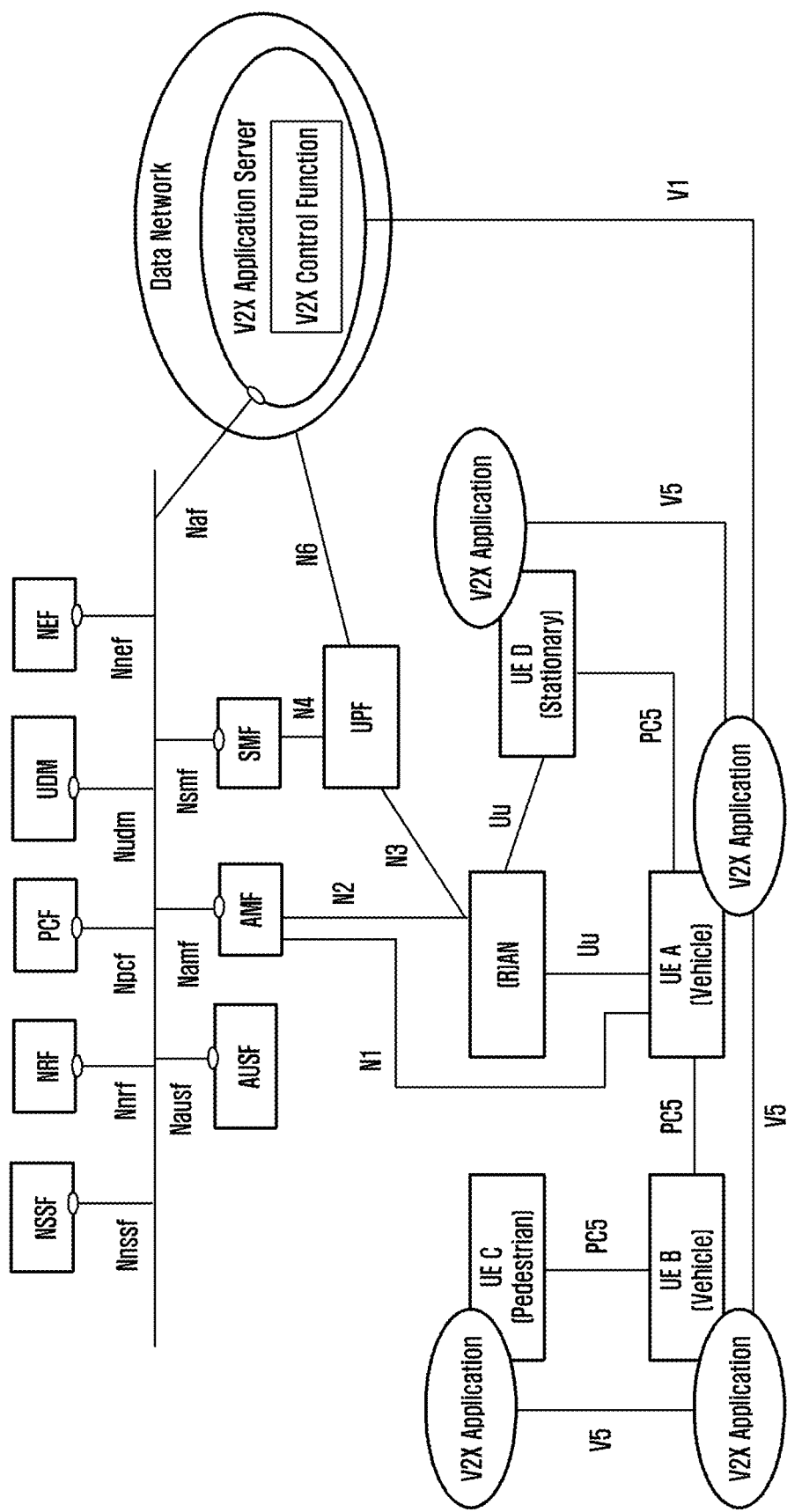
FIG. 1 shows an example of a 5G-based V2X system architecture with service-based interfaces between the network functions according to an embodiment of the disclosure.
Figure 2:
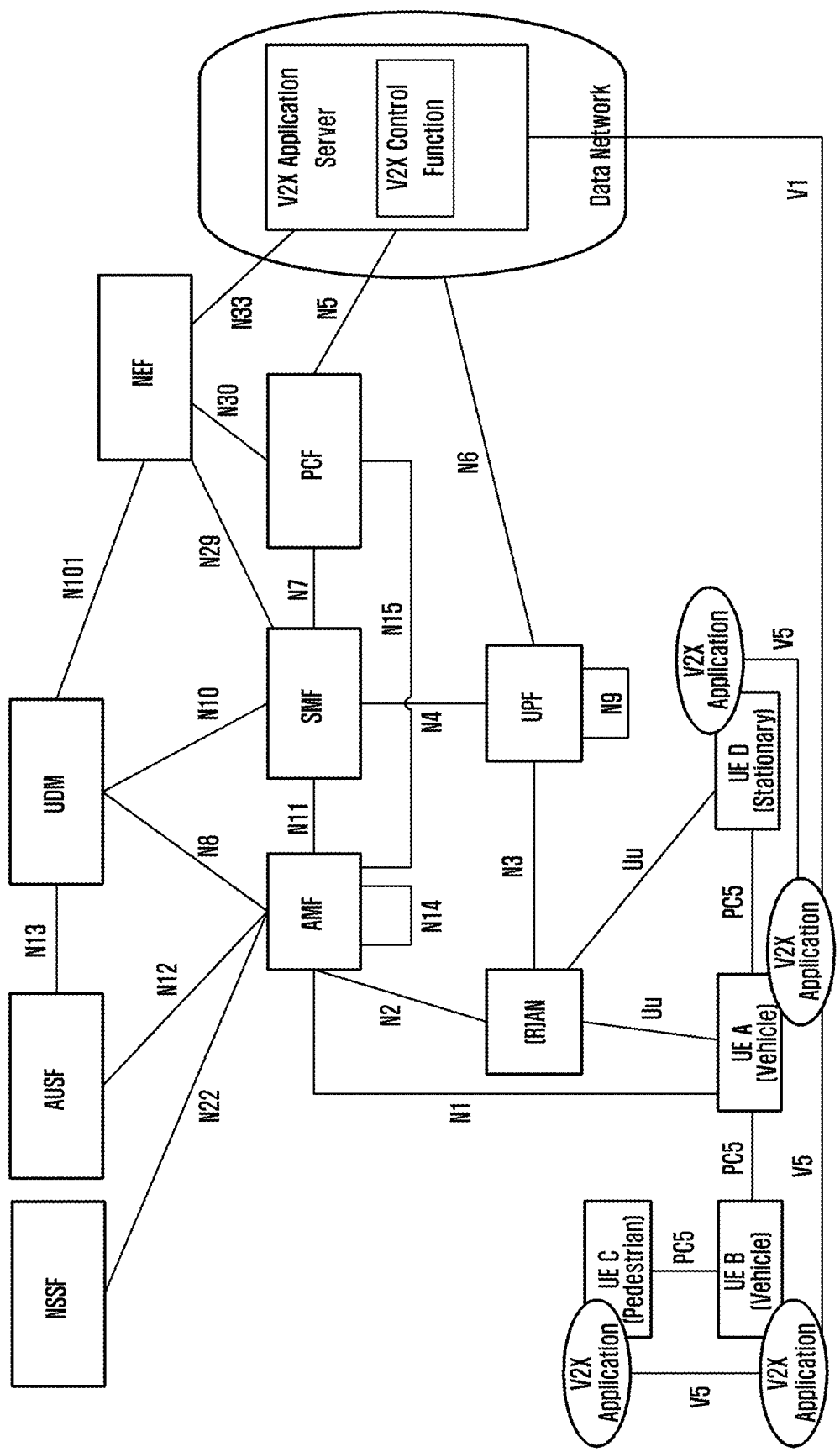
FIG. 2 illustrates shows an example of another 5G-based V2X system architecture with one-on-one reference points between the network functions according to an embodiment of the disclosure.

FIG. 1 is a structure diagram of a 5G-based V2X system architecture with service-based interfaces between the network functions (NFs) according to an embodiment of the disclosure. FIG. 2 is a structure diagram of another 5G-based V2X system architecture with one-on-one reference points between the network functions according to an embodiment of the disclosure.

With reference to FIG. 1, the V2X AS (application server) provides its services to other NFs via the Naf interface. The network exposure function (NEF) provides its services to other NFs via the Nnef interface. The PCF (policy control function) provides its services to other NFs via the Npcf interface.

FIG. 2 is a structure diagram of the 5G-based V2X system architecture shown in FIG. 1 with one-on-one reference points between the NFs. The NEF communicates with the V2X AS via the N33 reference point. The PCF communicates with the V2X AS via the N5 reference point.

FIGS. 1 and 2 show the same 5G-based V2X system architecture, which are schematically illustrated in different ways depending on the types of interfaces used between the NFs. In the following description, the interfaces shown in FIGS. 1 and 2 can be used together. The disclosure will be described based on FIG. 1 for ease of description, but the description of the disclosure is equally possible based on FIG. 2.

In the following description, a "user equipment (UE)" may be used interchangeably with a "terminal". In FIG. 1, UE A and UE B represent a vehicle terminal, UE C represents a pedestrian terminal, and UE D represents a road side unit (RSU) being a stationary fixed terminal. Depending on the type of service being described, the (R)AN may be referred to as an access network (AN) to which a terminal accesses for a V2N service or to an RSU for a V2I service. Here, the vehicle terminal may be a device embedded in the vehicle, or a terminal attached to the vehicle such as a smartphone or a dashboard camera.

With reference to FIG. 1, there may be a V2N (vehicle to network) service between the vehicle terminal (UE A) and the V2X application server (AS), a V2I (vehicle to infrastructure) service between the vehicle terminal (UE A) and the RSU (UE D), a V2V (vehicle to vehicle) service between the vehicle terminal (UE A) and the vehicle terminal (UE B), and a V2P (vehicle to pedestrian) service between the vehicle terminal (UE B) and the pedestrian terminal (UE C).

In FIG. 1, terminals (UE A and UE D) are connected to the 3GPP network via the Uu reference point. Here, the (R)AN to which UE A and UE D are connected may refer to a 3GPP radio access network (RAN) or to a non-3GPP access network (AN) such as WiFi. That is, UE A and UE D may access the 3GPP network via a 3GPP RAN or a non-3GPP AN such as WiFi. UE A and UE D may connect to the 3GPP network via different (R)ANs.

With reference to FIG. 1, terminals (UE B and UE C) can directly communicate with each other through the PC5 reference point (device-to-device (D2D) communication, or ProSe or PC5 communication) without being connected to the 3GPP network. In addition, UE A and UE D can access the 3GPP network through the Uu reference point and can directly communicate with another terminal through the PC5 reference point.

In one embodiment, UE A in FIG. 1 can communicate with the V2X AS via the V1 reference point to receive a V2N service. The V1 reference point is a logical reference point. For the actual data transmission between UE A and the V2X AS through the V1 reference point, the uplink data may be transmitted via the Uu reference point from UE A to the (R)AN, the N3 reference point from the (R)AN to the UPF, and the N6 reference point from the UPF to the data network, and the downlink data may be transmitted from the V2X AS to UE A over the reverse path.

In one embodiment, UE A in FIG. 1 may communicate with the (R)AN via the Uu reference point or may communicate with UE D being a fixed stationary terminal through the PC5 reference point to receive a V2I service. Here, the (R)AN and UE D may act as an RSU and provide a V2I service to UE A.

In one embodiment, UE A and UE B in FIG. 1 can communicate through the PC5 reference point to receive a V2V service.

In one embodiment, UE C and UE B in FIG. 1 can communicate through the PC5 reference point to receive a V2P service.

In one embodiment, the V2X AS in FIG. 1 can provide a V2X control function. The V2X control function may include a function of providing the terminal with parameter information necessary for the V2X service.

The V2X service parameters managed by the V2X AS may include at least one of authentication and/or authorization information, radio parameter information for receiving a V2X service when the terminal is located outside the network coverage, PC5 policy parameter information for providing a V2X service, or Uu policy parameter information for providing a V2X service.

The authentication information managed by the V2X AS may include information indicating whether the terminal has a capability to use a service provided by the V2X AS, information indicating the service available to the terminal among the services provided by the V2X AS in the case of the terminal being capable, information indicating whether the terminal can use a V2X service based on D2D communication (e.g., UE PC5 capability), information indicating whether the terminal can use a V2X service (e.g., UE Uu capability) based on multicast/broadcast communication (e.g., MBMS), information indicating whether the terminal can use a V2X service based on D2D communication outside the network coverage, and a list of mobile network operators (e.g., PLMN) capable of providing a V2X service to the terminal.

The information indicating the service available to the terminal among the services provided by the V2X AS may indicate whether the terminal can use a V2P service, whether the terminal can use a V2V service, whether the terminal can use a V2I service, whether the terminal can use a V2N service, or whether the terminal can use all the V2X services provided by the V2X AS. The information indicating the service available to the terminal among the services provided by the V2X AS may also indicate information on the service IDs available to the terminal among the service IDs (e.g., PSID or ITS-AID) mapped to the individual V2X services.

The radio parameter information for receiving a V2X service when the terminal managed by the V2X AS is located outside the network coverage may include information on the radio frequency and the region to use the radio frequency. When the terminal is located outside the network coverage, it can receive a V2X service by using the radio parameter information stored in advance.

The policy parameter information managed by the V2X AS for providing the V2X service may include at least one of a service ID (e.g., PSID or ITS-AID) indicating a V2X service and a corresponding destination layer-2 ID, packet priority information (e.g., ProSe per-packet priority (PPPP)) and corresponding packet delay budget information, a list of V2X services requiring privacy, a V2X service type (e.g., V2V, V2P, V2I or V2N) or V2X service ID (e.g., PSID or ITS-AID) and V2X frequency information needed to use the corresponding service, or V2X service type information (e.g., PSID or ITS-AID) that can use a specific PPPP or PPPR (ProSe per packet reliability). The terminal can transmit a V2X message through the PC5 reference point by setting the destination address to the destination layer-2 ID corresponding to the ID of a desired V2X service. The neighboring vehicle or RSU terminal having subscribed to the corresponding service can process the V2X message based on the destination layer-2 ID thereof. In addition, the terminal can transmit a V2X message whose packet priority corresponds to the required packet delay budget through the PC5 reference point. For example, in the case of an emergency V2X message, a small delay budget is required and a corresponding high priority value can be set in the emergency V2X message. In the case of a non-emergency message, a small delay budget is not required and a corresponding low priority value can be set in the corresponding V2X message.

In one embodiment, the V2X AS in FIG. 1 may provide the terminal with the V2X service parameters managed by it.

Figure 3:
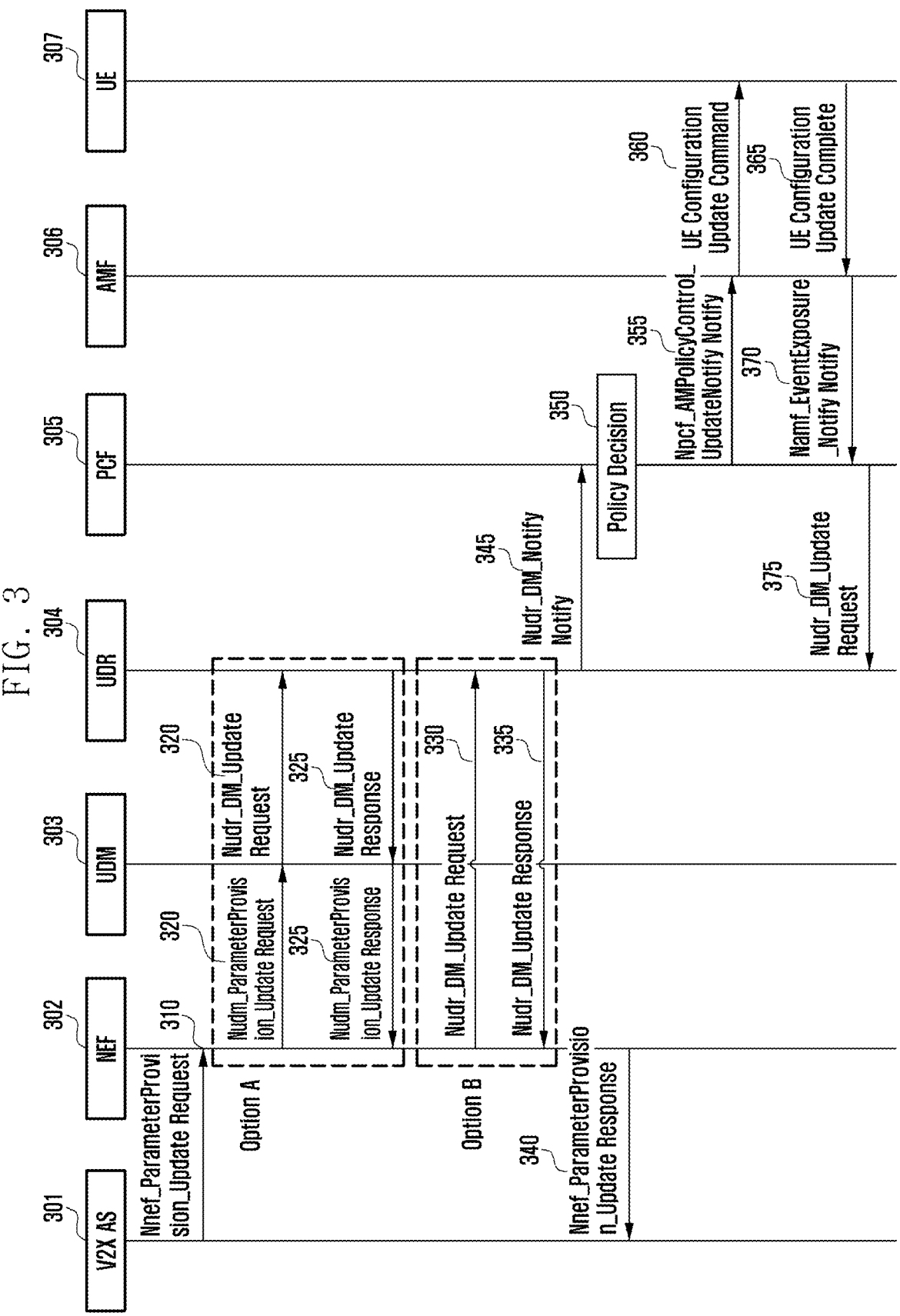
FIG. 3 depicts a procedure for providing V2X service parameters from the V2X AS to the terminal (UE) according to an embodiment of the disclosure.

FIG. 3 depicts a procedure for the V2X AS to provide V2X service parameters to the terminal according to an embodiment of the disclosure.

With reference to FIG. 3, in one embodiment, the V2X AS 301 may provide the V2X service parameters managed by it to the NEF 302 (step 310). Here, the communication between the V2X AS 301 and the NEF 302 may be performed via the Nnef service based interface shown in FIG. 1 or the N33 reference point shown in FIG. 2.

In one embodiment, the NEF 302 may store the V2X service parameters received from the V2X AS 301 in the UDR (user data repository) 304 (steps 320, 325, 330 and 335). Here, it is possible to use Option A in which the NEF 302 stores the V2X service parameters in the UDR 304 via the UDM (unified data management) 303 (steps 320 and 325) and Option B in which the NEF 302 directly stores the V2X service parameters in the UDR 304 (steps 330 and 335). In Option A, the communication between the NEF 302 and the UDM 303 may be performed using the Nudm service-based interface shown in FIG. 1, and the communication between the UDM 303 and the UDR 304 may be performed via the Nudr service-based interface shown in FIG. 1 or via the N101 reference point shown in FIG. 2. For example, the NEF 302 may transmit a message (e.g., Nudm_ParameterProvision_Update Request) containing the V2X service parameters received from the V2X AS 301 to the UDM 303, and the UDM 303 may transmit a message (e.g., Nudr_DM_Update Request) containing the V2X service parameters received from the NEF 302 to the UDR 304 (step 320). Then, as a reply, the UDR 304 may transmit a response message (e.g., Nudr_DM_Update Response) to the UDM 303, and the UDM 303 may transmit a response message (e.g., Nudm_ParameterProvision_Update Response) to the NEF 302 (step 325). In Option B, the communication between the NEF 302 and the UDR 304 may be performed via the Nudr service-based interface shown in FIG. 1. For example, the NEF 302 may transmit a message (e.g., Nudr_DM_Update Request) containing the V2X service parameters received from the V2X AS 301 to the UDR 304 (step 330). Then, as a reply, the UDR 304 may transmit a response message (e.g., Nudr_DM_Update Response) to the NEF 302 (step 335).

In one embodiment, after storing the V2X service parameters in the UDR 304, the NEF 302 can notify the V2X AS 301 of whether the parameter information is successfully updated (step 340).

In one embodiment, when the V2X service parameter information is updated in the UDR 304, the UDR 304 can notify the PCF 305 of the updated information (step 345). To this end, the PCF 305 may request an event subscription to the UDR 304 in advance. The types of events requested by the PCF 305 to the UDR 304 may include updating the policy information of the V2X service, updating the terminal policy information related to the V2X service, updating the policy information of the terminal, and the like. Here, the communication between the UDR 304 and the PCF 305 may be performed via the Nudr service-based interface shown in FIG. 1.

In one embodiment, upon receiving the updated V2X service parameter information of the terminal from the UDR 304, the PCF 305 may determine whether to transmit the updated V2X service information to the terminal 307 (step 350).

In one embodiment, upon receiving the updated V2X service parameter information of the terminal 307 from the UDR 304, the PCF 305 may process the corresponding information and store the processed information in the UDR 304 again (step 375).

In one embodiment, the PCF 305 may provide V2X service parameter information to the terminal 307 via the AMF (access and mobility management function) 306 (steps 355 and 360). The V2X service parameter information may be information received by the PCF 305 from the UDR 304 at step 345 or may be a processed version of the information received by the PCF 305 from the UDR 304 at step 345. Here, the communication between the PCF 305 and the AMF 306 may be performed via the Npcf service-based interface shown in FIG. 1 or the N15 reference point shown in FIG. 2. The communication between the AMF 306 and the UE 307 may be performed via the N1 reference point shown in FIG. 1. Here, the N1 reference point is a logical reference point, and the actual data can be transmitted to the terminal 307 via the N2 reference point and the Uu reference point.

In one embodiment, upon receiving the V2X service parameter information, the terminal 307 may store the received information and transmit a reply message indicating successful reception of the V2X service parameter information to the network (step 365). The AMF 306 may notify the PCF 305 that the V2X service parameter information has been successfully transmitted to the terminal 307 (step 370).

Figure 4:
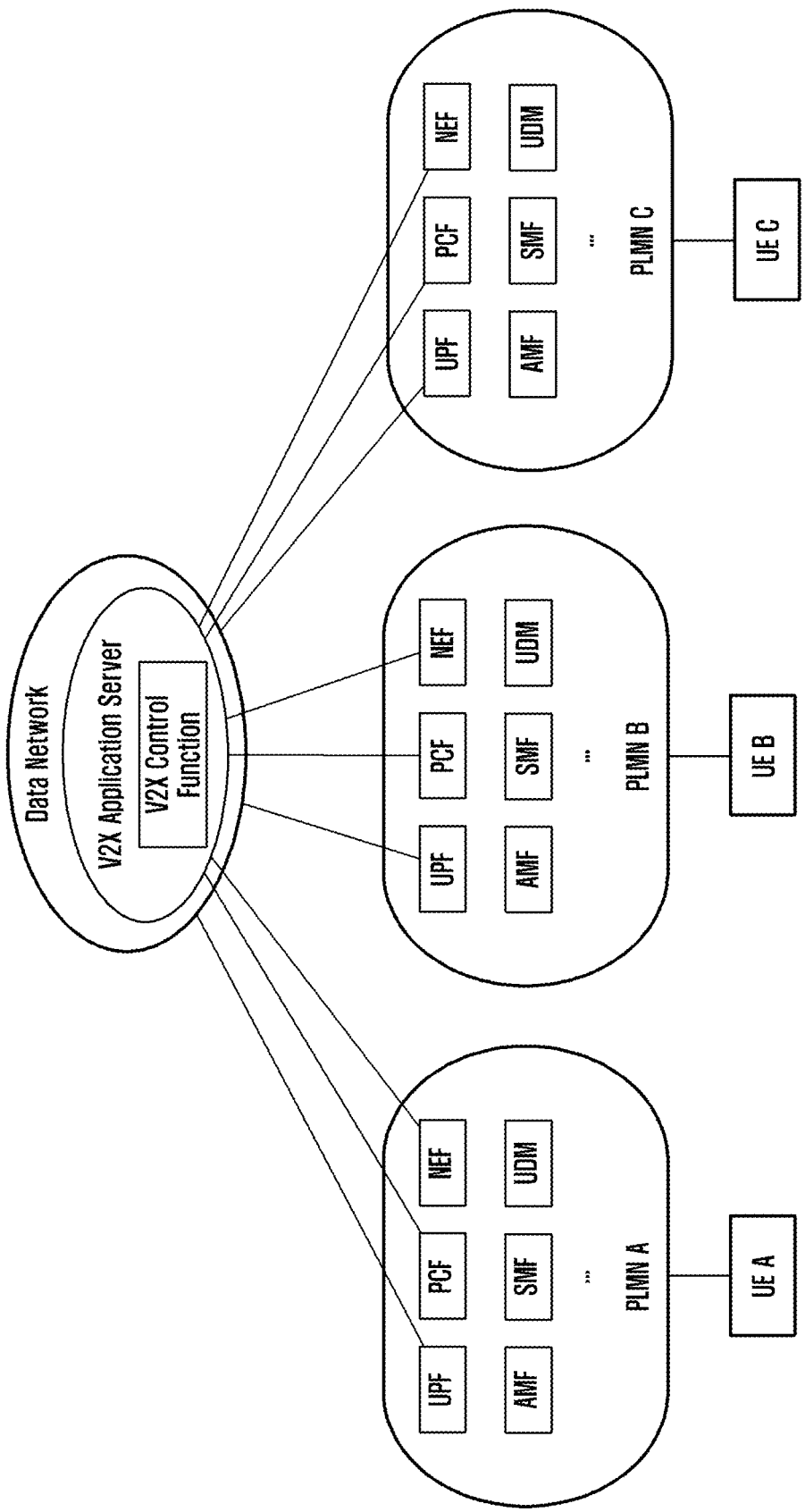
FIG. 4 illustrates a structure in which the V2X AS is connected to plural mobile network operators according to an embodiment of the disclosure.

FIG. 4 illustrates a structure in which the V2X AS is connected to plural mobile network operators according to an embodiment of the disclosure.

One V2X AS can be connected to the NEFs of multiple PLMNs. The V2X AS can provide V2X service parameters to V2X service terminals (e.g., vehicle terminal, pedestrian terminal, and RSU) of each PLMN in a manner shown in FIG. 3. Here, the V2X AS can manage common V2X service parameters and provide the same to the terminal independently of the PLMN to which the terminal has subscribed. Alternatively, the V2X AS may manage V2X service parameters for each PLMN to which the terminal has subscribed and provide the UE with the V2X service parameters corresponding to the PLMN to which the terminal has subscribed.

In one embodiment, the V2X AS provides the V2X service parameters to the terminal. Hence, the burden of managing the service parameter information can be reduced in the PLMN. In addition, the need for the roaming interfaces and associated procedures to support roaming terminals is reduced at the PLMN level. That is, to support roaming terminals, the V2X AS can provide relevant service parameter information to the terminal.

In one embodiment, the V2X AS can provision the V2X service parameter information to the terminal through the 3GPP NEF. The disclosure is not limited to the V2X service and is applicable to other services provided through the 3GPP network. For example, in the case of an IoT service, the IoT AS providing IoT services can provide a terminal with the parameter information to be provisioned to the terminal through the NEF. In the case of a smart factory service, the smart factory AS providing smart factory services can provide a terminal with the parameter information to be provisioned to the terminal through the NEF. In the case of a multicast broadcast service, the multicast broadcast AS providing multicast broadcast services can provide a terminal with the parameter information to be provisioned to the terminal through the NEF. Additionally, in the case of a public safety service, the MCPTT AS providing mission critical services can provide a terminal with the parameter information to be provisioned to the terminal through the NEF. That is, the method of delivering the information needed by a terminal for service provisioning to the terminal through the NEF is not limited to a specific service but can be applied to all the services.

Embodiment B

The terms "slice", "service", "network slice", "network service", "application slice", and "application service" may be used interchangeably in describing the embodiments of the disclosure.

The mobile network operator can allocate suitable network resources to a service for each slice or a set of slices. Here, the network resource may indicate a specific NF or a logical resource or radio resource provided by the NF.

Figure 5:
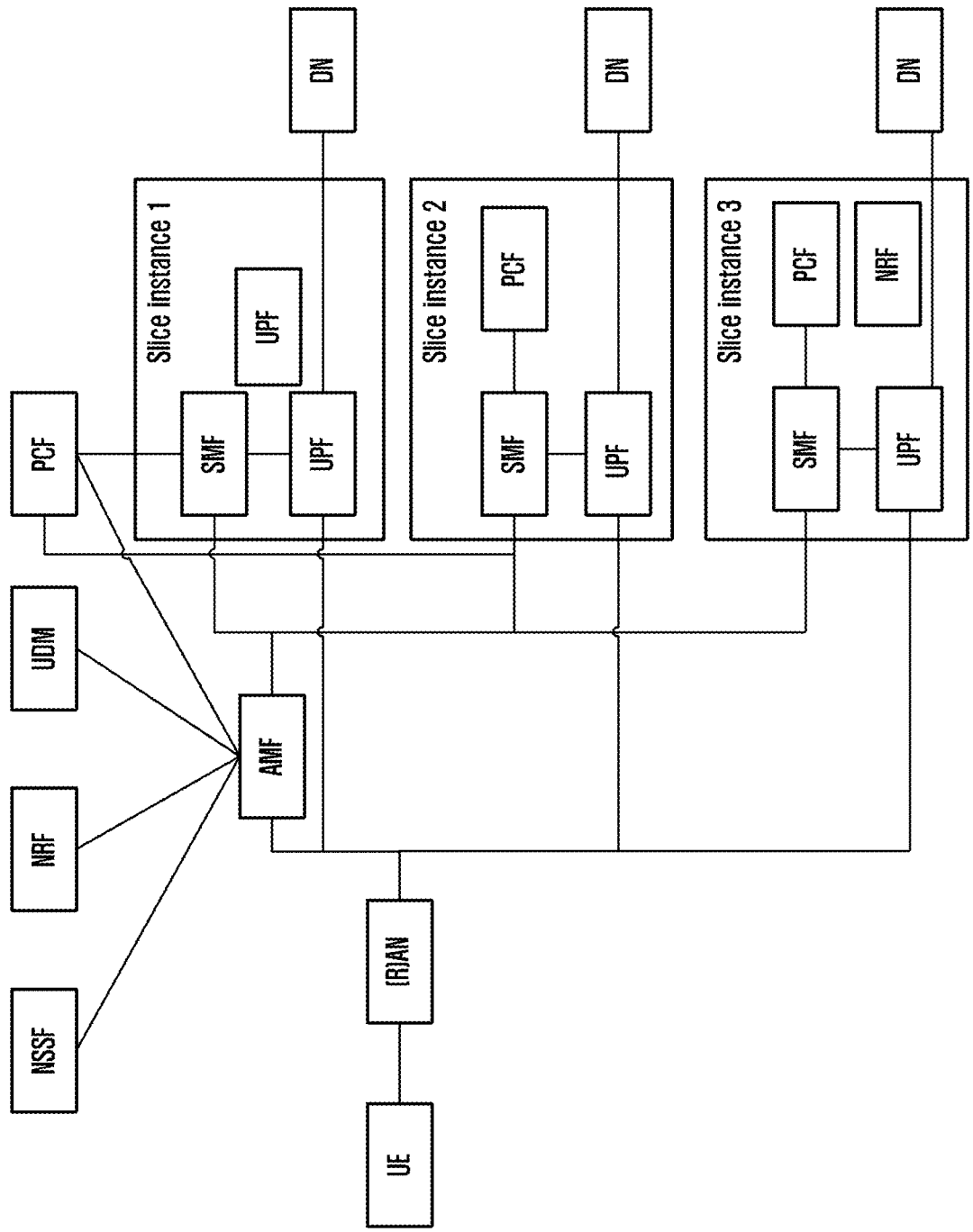
FIG. 5 illustrates a 5G network slice structure according to an embodiment of the disclosure.

FIG. 5 illustrates a 5G network slice structure according to an embodiment of the disclosure.

The PLMN may provide multiple network slices, and each network slice may be provided to the terminal in the form of a slice instance. The terminal can connect to the network and receive services from several slice instances at the same time. Each slice instance can be composed of the network resources needed to provide the corresponding network slice.

For example, slice instance 1 is composed of the SMF (session management function) and the UPF (user plane function), and slice instance 2 is composed of the SMF, the UPF, and the PCF. In FIG. 5, the SMF of slice instance 2 may have an association with the PCF at the PLMN level and the PCF at the slice level. The PCF at the PLMN level can provide the policy information of the corresponding PLMN to the SMF. The slice-level PCF belonging to slice instance 2 may manage the policies necessary to provide the corresponding slice and may provide the corresponding information to the SMF.

Each slice can be identified by a slice ID. An example of the slice ID may be the S-NSSAI (single-network slice selection assistance information) defined by 3GPP.

Figure 6:
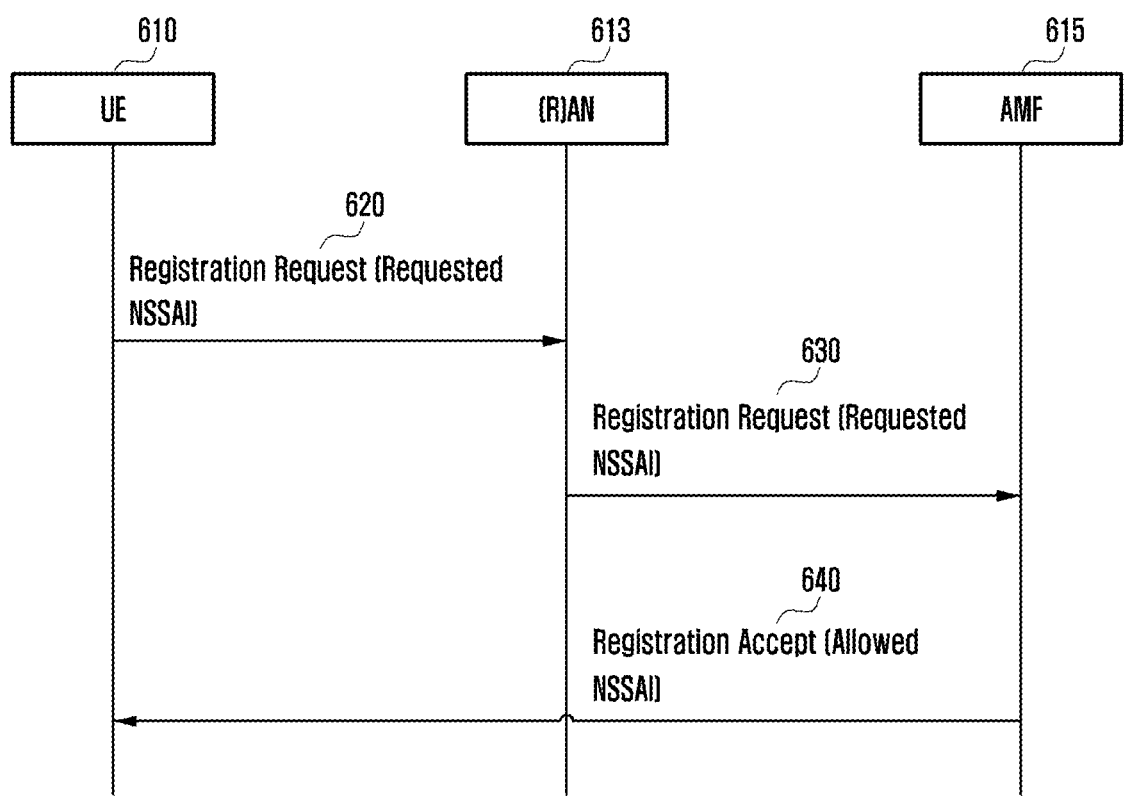
FIG. 6 depicts a procedure for using a slice ID (S-NSSAI) when the terminal accesses a 3GPP network according to an embodiment of the disclosure.

FIG. 6 depicts a procedure for using a slice ID when the terminal accesses a 3GPP network according to an embodiment of the disclosure.

With reference to FIG. 6, the terminal 610 transmits a registration request message to the AMF 615 via the AN 613 to access the network (steps 620 and 630). At this time, the terminal 610 may include the desired slice information (requested NSSAI) in the registration request message. The requested NSSAI may include a list of S-NSSAIs. That is, the terminal 610 wishing to use a V2X service can send the AMF 615 the requested NSSAI including the S-NSSAI indicating the V2X slice by use of a registration request message. Upon receiving the registration request message, the AMF 615 determines whether the terminal 610 is allowed to use the requested slice (requested NSSAI) and transmits a registration accept message containing information on the slice available to the terminal (allowed NSSAI) to the terminal 610 (step 640).

FIG. 7 shows examples of S-NSSAIs indicating V2X service characteristics and V2X slices according to an embodiment of the disclosure.

With reference to FIG. 7, the slice/service type (SST) for providing a V2X service can be V2X, V2N, V2I, V2V, V2P, or the like. The V2X SST values can represent vehicle communication services including V2N, V2I, V2V and V2P services. Vehicle communication services defined by standardization bodies other than 3GPP (e.g., DSRC, WAVE, and ITS) can also be identified by the SST values. As described above, the SST for providing the V2X services can be applied to various vehicle communication services without being limited to the services described in the disclosure.

In FIG. 7, the SST for each V2X service may have its own SST value. One S-NSSAI for a V2X service is composed of an SST value and an SD (slice differentiator) value. The SST value of an S-NSSAI refers to a V2X service, and the SD value thereof can refer to additional information other than the V2X service. In one embodiment, the SD value may indicate a vehicle manufacturer (e.g., BMW, Audi, Hyundai, or Toyota), a terminal manufacturer (e.g., Samsung, or Apple), a V2X service provider, or a mobile network operator (e.g., SKT, KT, AT&T, or Deutsche Telekom). The SD value is optional and may be not included in the S-NSSAI.

In one embodiment, when a terminal (e.g., vehicle terminal, pedestrian terminal, or RSU) using a V2X service accesses the 3GPP network, it can transmit a registration request message containing a desired V2X slice ID (i.e., S-NSSAI indicating a desired V2X slice). This process is depicted in FIG. 6. An S-NSSAI indicating a V2X slice included in the registration request message is illustrated in FIG. 7. For example, a Toyota vehicle terminal having subscribed to the V2N service and the V2V service may include the following requested slice information (requested NSSAI) in the registration request message.

Requested NSSAI: {(V2X, Toyota)}

In the above example, the V2X service may be a service for a Toyota vehicle, and the SST value is "V2X" and the SD value is "Toyota" being a vehicle manufacturer. The requested slice information may include S-NSSAIs for V2V and V2N services instead of the S-NSSAI for a V2X service.

Requested NSSAI: {(V2N, Toyota), (V2V, -)}

In the above example, the V2X slice may be a service for a Toyota vehicle, and the SST value is "V2N" and the SD value is "Toyota" being a vehicle manufacturer. Also, in the above example, the V2V slice may be provided regardless of the terminal type, and the SST value may be "V2V" and the SD value may be not included. Upon receiving the requested slice (requested NSSAI) information from the terminal, the AMF determines whether the slice requested by the terminal is available and may transmit the terminal a registration accept message containing information on the slice available to the terminal (allowed NSSAI). The allowed NSSAI may have the same value as the requested NSSAI.

In one embodiment, the SST value or SD value constituting the S-NSSAI can be used only in the NF of the PLMN that has defined the S-NSSAI. That is, the NF of the PLMN that has not defined the S-NSSAI may be unable to interpret the SST value or the SD value of the S-NSSAI. To use the LTE or 5G V2X service, a V2X terminal must subscribe to a PLMN that can provide the V2X service. The PLMN to which the terminal has subscribed may be referred to as the home PLMN (HPLMN). The HPLMN provides the S-NSSAI value for the V2X slice to the V2X terminal. When the V2X terminal connects to the network, it transmits a registration request message containing the S-NSSAI value received from the HPLMN to the AMF. Because the AMF is the NF of the HPLMN having allocated the S-NSSAI, the AMF can interpret the SST and SD values included in the S-NSSAI and select the V2X slice corresponding to the SST and SD values. In one embodiment, when the V2X terminal roams into the VPLMN (visited PLMN), the V2X terminal can transmit a registration request message including the S-NSSAI provided by, the HPLMN to the AMF of the VPLMN. Because the AMF having received the registration request message is the NF of the VPLMN, it may be unable to interpret the SST value or the SD value included in the S-NSSAI received from the terminal. If the AMF cannot interpret both the SST value and the SD value, the S-NSSAI requested by the terminal may be rejected and the S-NSSAI may be not included in the allowed NSSAI contained in the registration accept message. If the AMF can interpret the SST value only and cannot interpret the SD value, the AMF may select a V2X slice corresponding to the SST value while ignoring the SD value and provide the selected V2X slice to the terminal.

Figure 8:
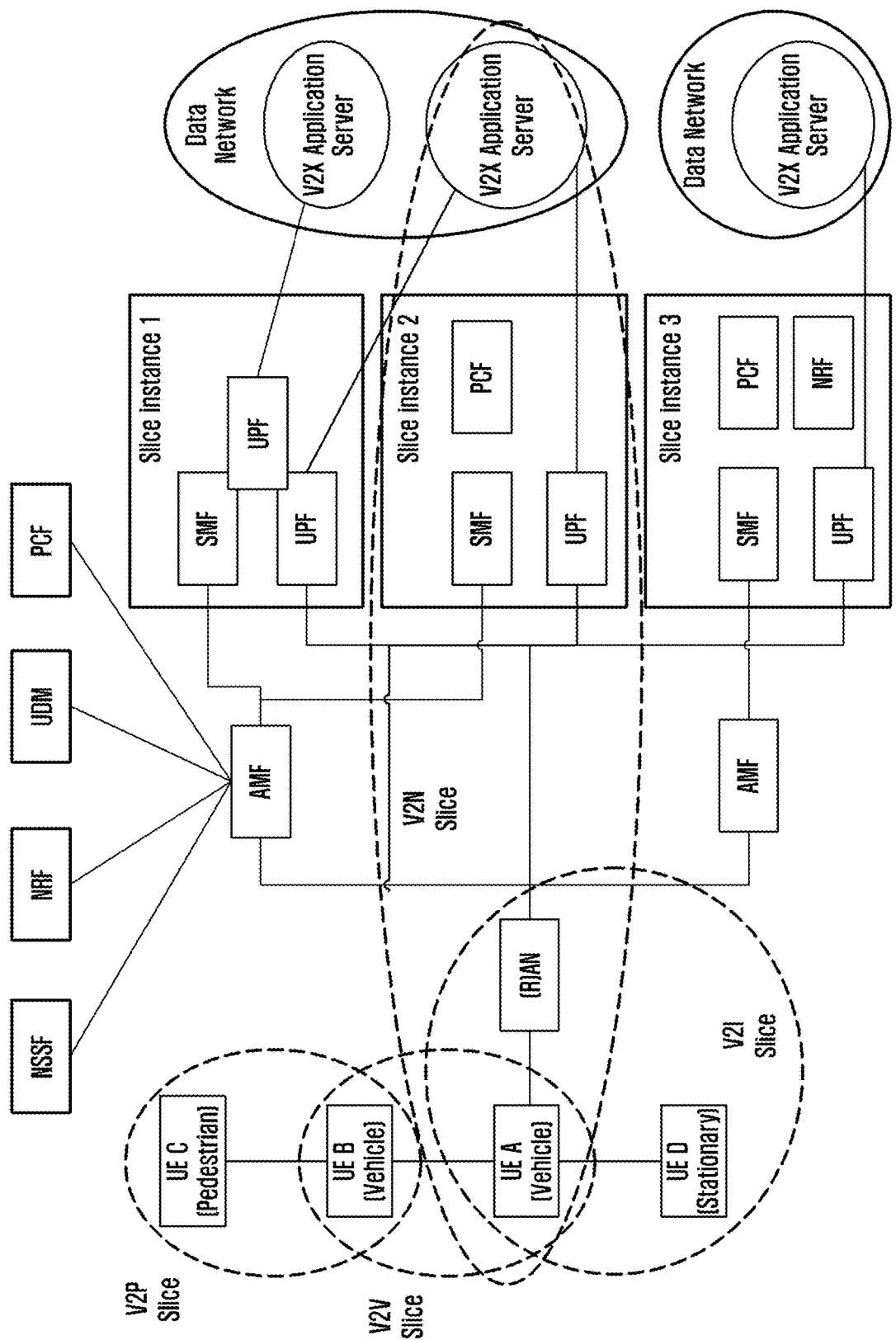
FIG. 8 shows a structure diagram of 5G-based V2X slices according to an embodiment of the disclosure.

FIG. 8 shows a structure diagram of 5G-based V2X slices according to an embodiment of the disclosure.

In one embodiment, with reference to FIG. 8, the V2N slice may include a vehicle terminal (UE A) using a V2N service, an access network ((R)AN) to which the terminal is connected, 3GPP 5G core network functions (AMF, SMF and UPF), and the V2X AS. The V2I slice can include a vehicle terminal (UE A), an RSU terminal (UE D), and the (R)AN. The V2V slice may include vehicle terminals (UE A and UE B) that utilize the V2V service based on D2D communication. The V2P slice may include a vehicle terminal (UE A) and a pedestrian terminal (UE B).

Embodiment C

A V2X terminal conforming to the 3GPP standards may support a radio access technology (RAT) for D2D communication. The RAT types may include LTE (Long Term Evolution) and NR (New Radio), and may further include a RAT type to be defined by 3GPP in the future and a wireless network technology (e.g., WiFi) defined by a standardization body other than 3GPP. When a terminal supporting a plurality of RATs for D2D communication sends a V2X message, it is necessary for the terminal to select the most appropriate RAT for the corresponding V2X application.

In one embodiment, the V2X AS can select the appropriate RAT for each of the V2X services provided by the V2X AS. The V2X AS can manage information on the V2X services and associated RATs.

Figure 10:
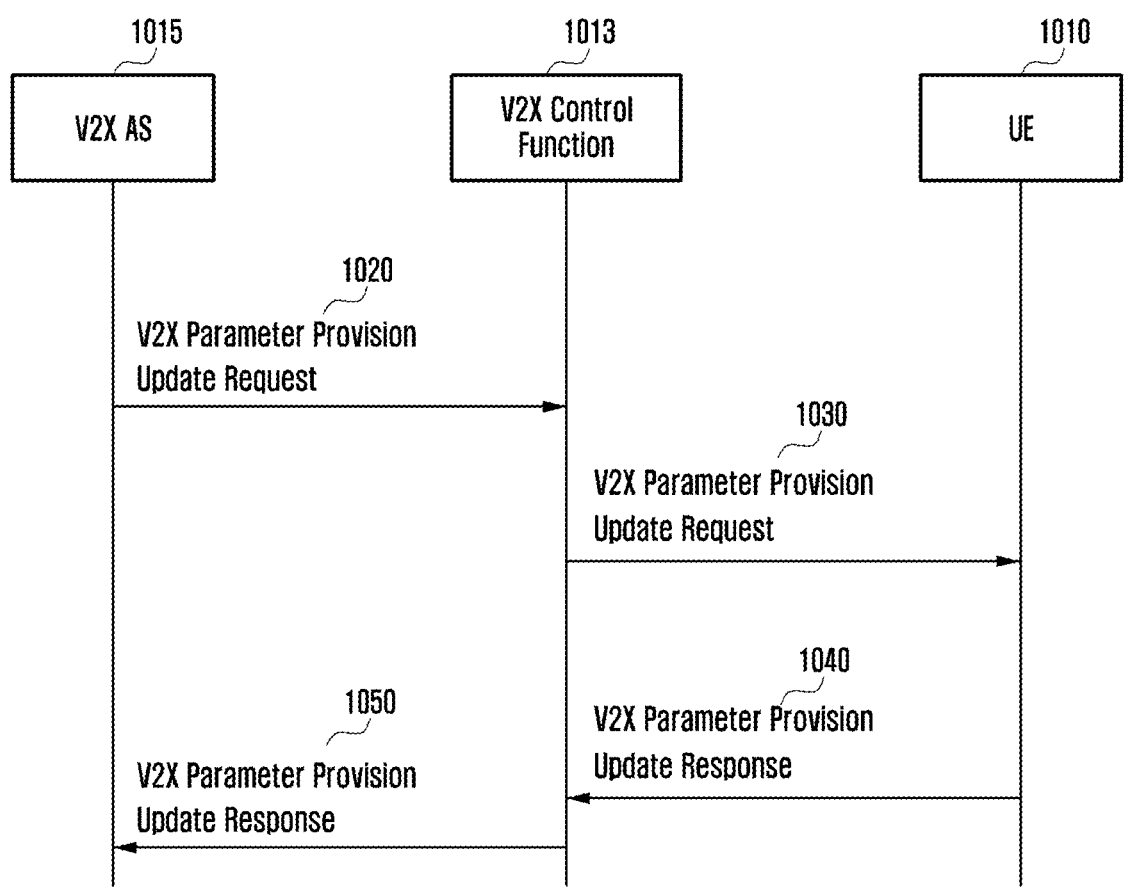
FIG. 10 depicts a procedure for providing V2X service parameter information to the terminal according to an embodiment of the disclosure.
Figure 11:
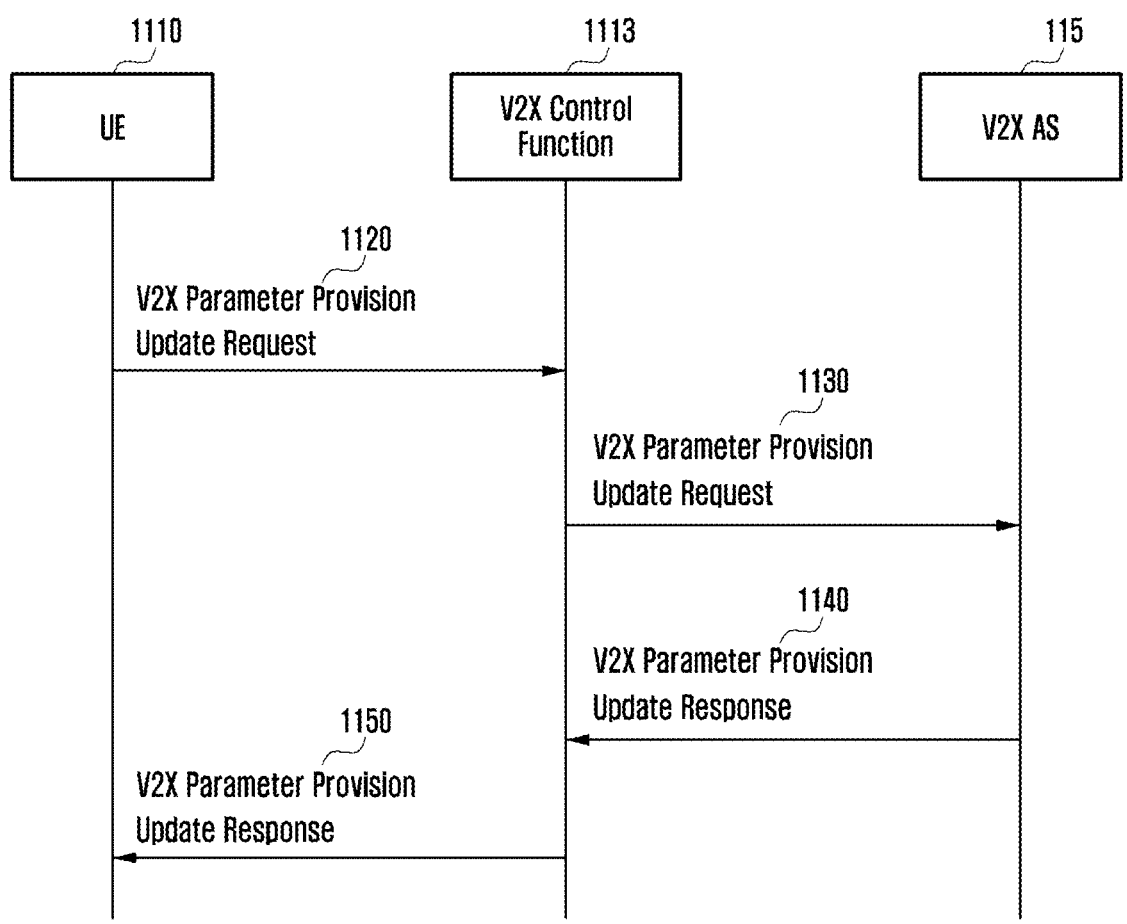
FIG. 11 depicts a procedure for the terminal to request and obtain V2X service parameter information from the V2X AS according to an embodiment of the disclosure.
Figure 12A:
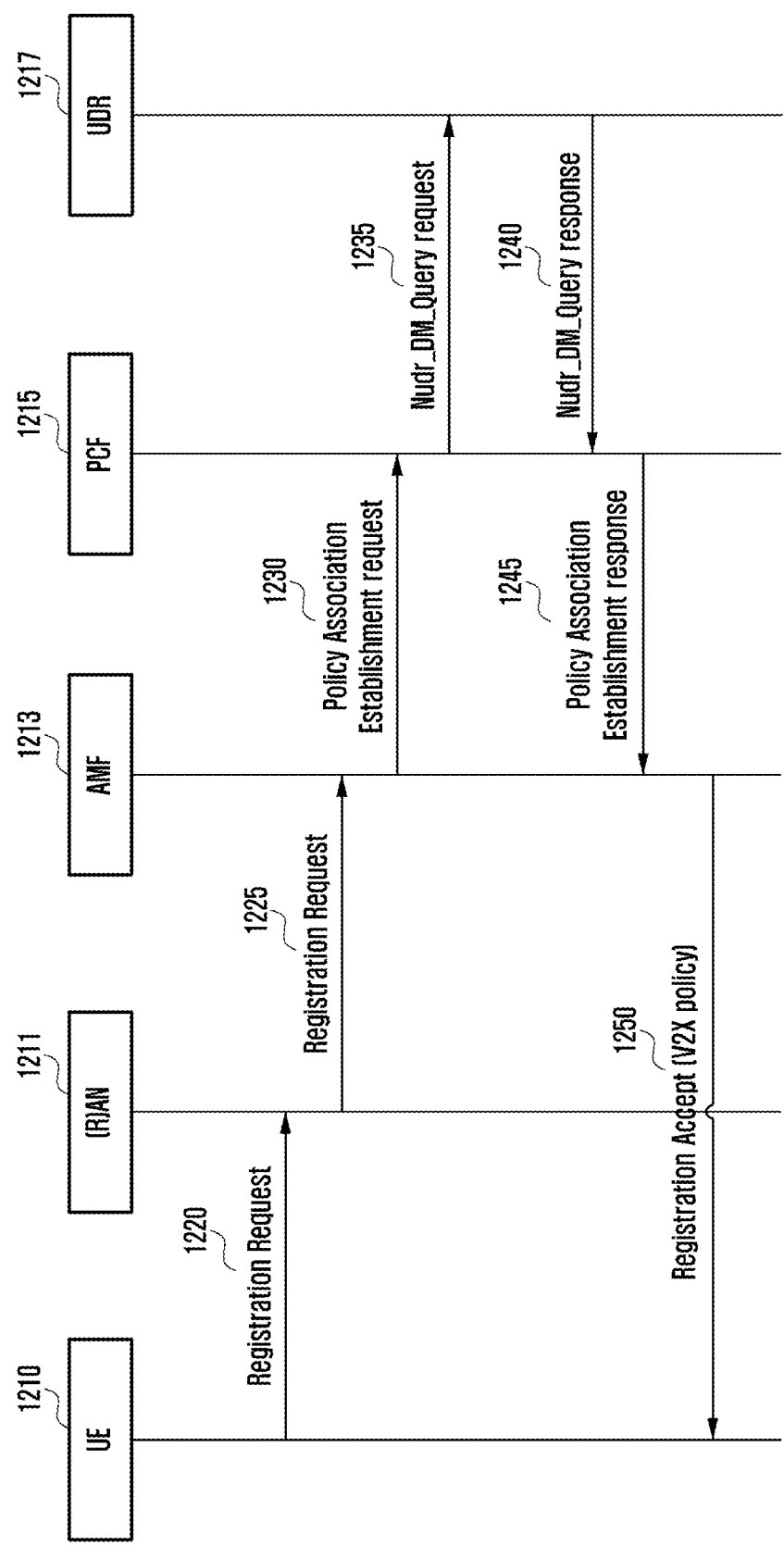
FIGS. 12A to 12C depict examples of a plurality of procedures for a terminal to obtain V2X service parameter information during the registration process according to an embodiment of the disclosure.
Figure 12B:
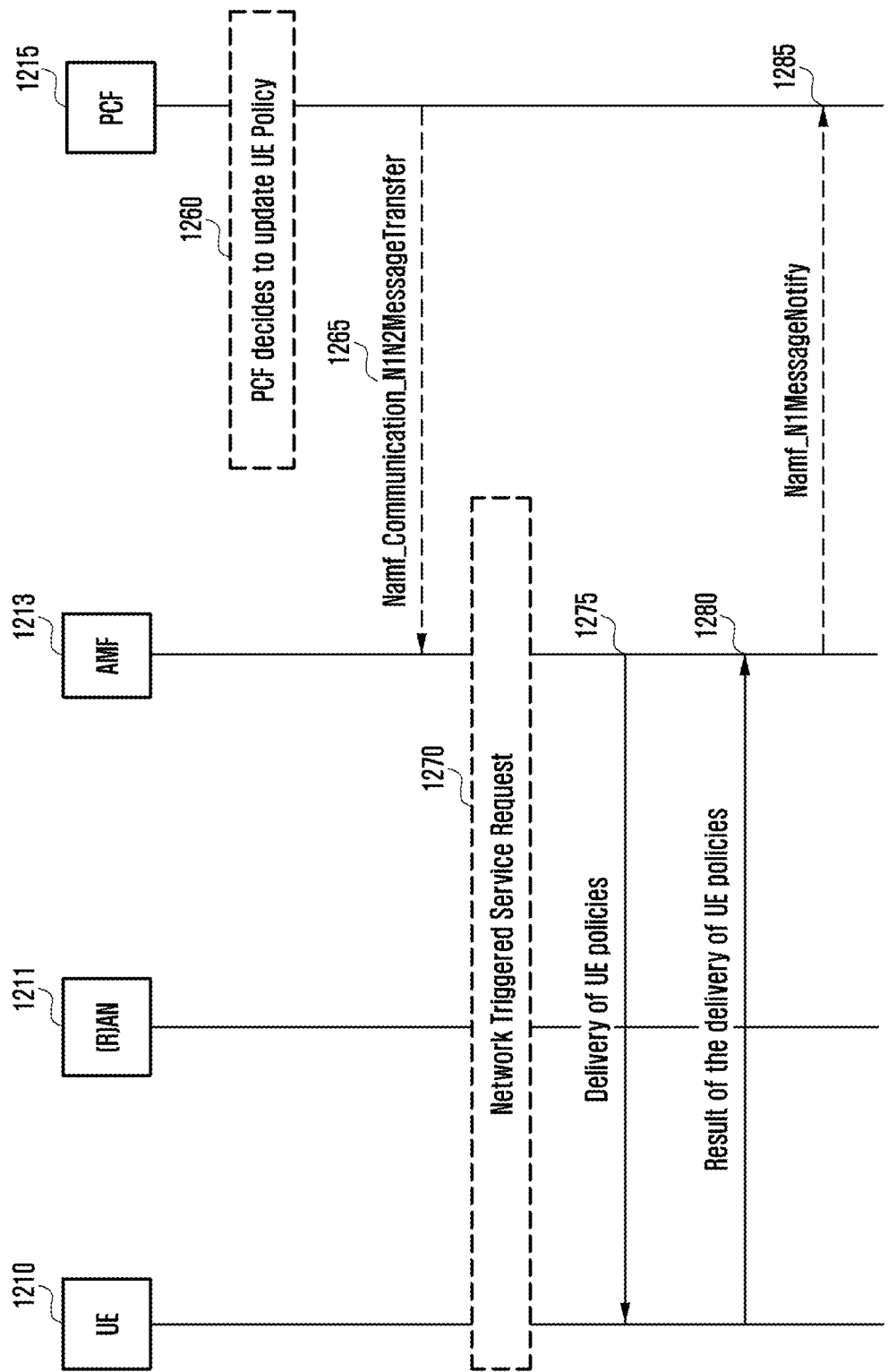
Figure 12C:
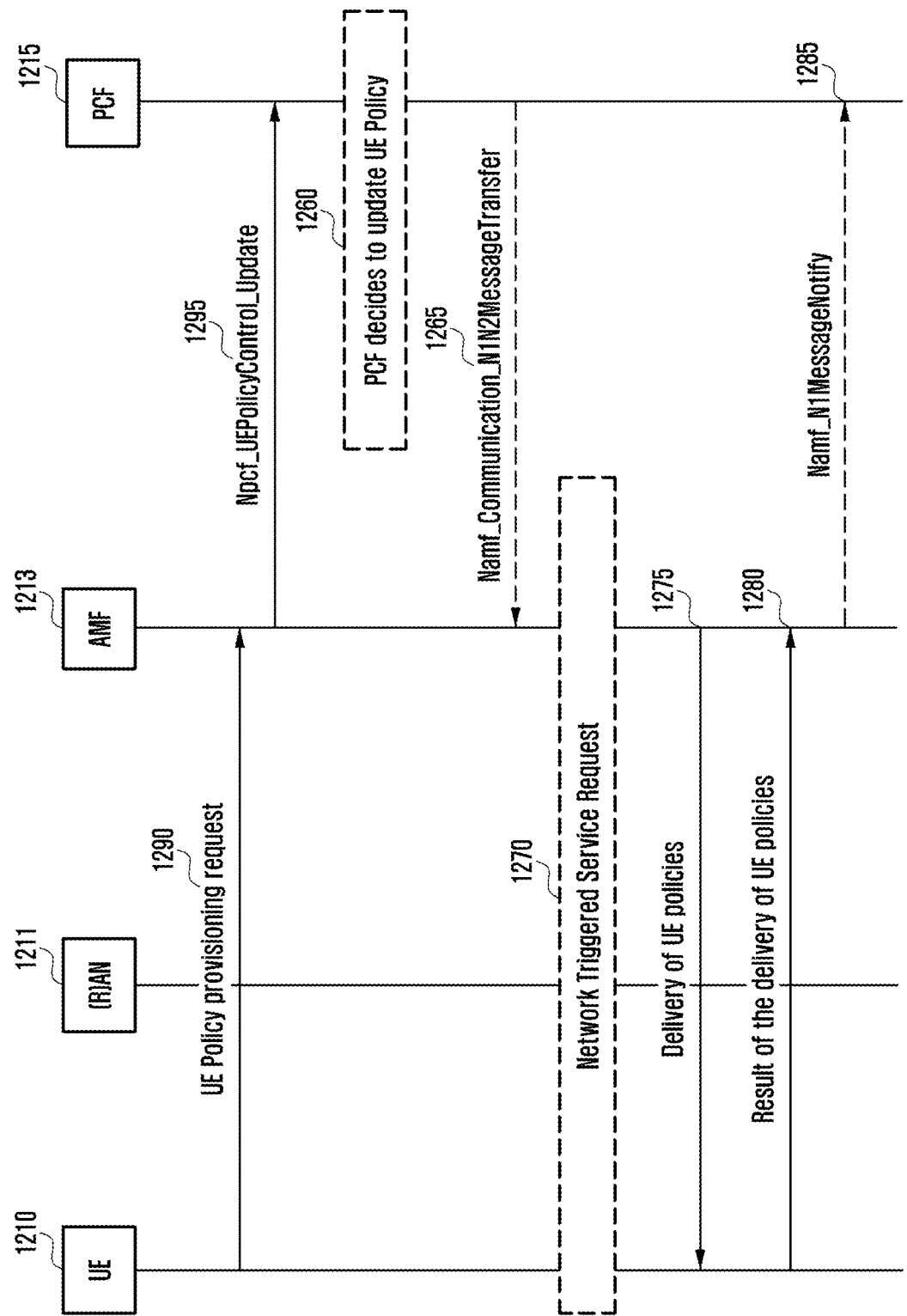

FIG. 9 shows an example of a mapping between V2X services managed by the V2X AS and RAT types according to an embodiment of the disclosure. FIG. 10 depicts a procedure for providing V2X service parameter information to the terminal according to an embodiment of the disclosure. FIG. 11 depicts a procedure for the terminal to request and obtain V2X service parameter information from the V2X AS according to an embodiment of the disclosure. FIGS. 12A to 12C depict a procedure for a terminal to obtain V2X service parameter information during the registration process according to an embodiment of the disclosure.

In one embodiment, with reference to FIG. 9, the V2X service is identified by a service ID (e.g., PSID (provider service identifier) or ITS-AID (intelligent transport systems application identifier)), and can be associated with a RAT type for service provisioning.

Mapping information between the V2X service type and the RAT type can be configured. Here, the V2X service type may be identified by a V2X service ID (e.g., PSID or ITS-AID). The RAT type may be identified by a transmission profile (Tx profile). Based on the mapping information between the service type and the Tx profile, the terminal can identify the V2X service of the packet to be transmitted and the Tx profile to be used to transmit the packet.

For example, in the case of a basic safety message service, the V2X service ID is '0' and the terminal can select the LTE RAT according to the RAT type (i.e., Tx profile) to send a basic safety message. In the case of an event notification message service, which may be used by a V2X terminal in the event of an emergency to notify a nearby V2X terminal of a dangerous situation, the V2X service ID is '1' and the terminal can select the NR RAT corresponding to the Tx profile to transmit an event notification message. In the case of an extended sensors service, the V2X service ID is '2' and the terminal may select at least one of the LTE RAT or the NR RAT to transmit an extended sensors service message. The mapping between the service types and the RAT types shown in FIG. 9 is an example for describing the disclosure, and does not mean that the basic safety message service is available only through the LTE RAT. Which RAT type is mapped to which V2X service type or V2X ID can be determined by the V2X service provider providing the V2X services. If both the LTE RAT and the NR RAT are available such as when the V2X service ID is '2' in the above example of FIG. 9, it is possible to map the V2X service type and the Tx profile in the following two ways.

First, the mapping can be performed using a Tx profile indicating the LTE RAT and a Tx profile indicating the NR RAT for one service type ID. For example, when the Tx profile indicating LTE is '0' and the Tx profile indicating NR is '1', the Tx profile corresponding to the V2X service type ID of '2' can be mapped to '0' and '1'.

Second, it is possible to map the V2X service type ID by using one Tx profile indicating both the LTE RAT and the NR RAT. For example, when the Tx profile indicating LTE is '0' and the Tx profile indicating NR is '1', the Tx profile indicating both LTE and NR can be defined as '2', and the Tx profile corresponding to the V2X service type ID of '2' can be mapped to '2'.

To support LTE PC5 communication, a ProSe per packet priority (PPPP)/ProSe per packet reliability (PPPR) based QoS model can be used. The PPPP may contain a value indicating a priority level. For example, the PPPP can represent values from '1' to '8'. If the PPPP is '1', it may be determined that the priority is higher than when the PPPP is '2'. For example, the PPPR can represent values from '1' to '8'. If the PPPR is '1', it may be determined that higher reliability is required than when the PPPR is '2'.

To support NR PC5 communication, a QoS model based on PQI (PC5 5QI) can be used. The PQI may include information regarding at least one of the priority level, packet delay budget, packet error rate, averaging window, or maximum data burst volume. In addition, the communication range value can be used together with the PQI to support NR PC5 communication. Table 1 below shows examples of the PQI.

TABLE 1

[Examples of standard 5QI values defined in 3GPP]

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |

TABLE 1-continued

[Examples of standard 5QI values defined in 3GPP]

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plant Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI (6/8/9) |
| 79 | | 65 | 50 ms (NOTE 10, NOTE 13) | $10^{-2}$ | N/A | N/A | V2X messages |

TABLE 1-continued

[Examples of standard 5QI values defined in 3GPP]

| 5QI Value | Resource Type | Default Priority Level | Packet Delay Budget | Packet Error Rate | Default Maximum Data Burst Volume (NOTE 2) | Default Averaging Window | Example Services |
| --- | --- | --- | --- | --- | --- | --- | --- |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution-high voltage (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPv6 based, IPSec protected GTP tunnel to the 5G-AN node (the value is calculated as in Annex C of TS 23.060 [56] and further reduced by 4 bytes to allow for the usage of a GTP-U extension header).
NOTE 4:
A delay of 1 ms for the delay between a UPF terminating N6 and a 5G-AN should be subtracted from a given PDB to derive the packet delay budget that applies to the radio interface.
NOTE 5:
A delay of 2 ms for the delay between a UPF terminating N6 and a 5G-AN should be subtracted from a given PDB to derive the packet delay budget that applies to the radio interface.
NOTE 6:
A delay of 5 ms for the delay between a UPF terminating N6 and a 5G-AN should be subtracted from a given PDB to derive the packet delay budget that applies to the radio interface.
NOTE 7:
For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value.
NOTE 13:
A delay of 20 ms for the delay between a UPF terminating N6 and a 5G-AN should be subtracted from a given PDB to derive the packet delay budget that applies to the radio interface.
NOTE 14:
This 5QI is not supported as it is only used for transmission of V2X messages over MBMS bearers as defined in TS 23.285 [72].

In one embodiment, the mapping between the PPPP/PPPR-based QoS model for LTE PC5 communication and the PQI-based QoS model for NR PC5 communication can be determined in various ways as follows.

First, to determine a compatible mapping between the packet priority level for the PQI and the PPPP, it is possible to define a PPPP value or a range of PPPP values to which a priority level value or a range of priority level values is mapped. For example, priority level values of '7' and '15' can be mapped to a PPPP value of '1'. Priority level values of '0' to '20' can be mapped to a PPPP value of '1'.

To determine a compatible mapping between the packet delay budget for the PQI and the PPPP, it is possible to define a packet delay budget value that is mapped to a PPPP value. It is possible to define a packet delay budget value for the PQI or a range of packet delay budget values to which a packet delay budget value or a range of packet delay budget values mapped with a PPPP value is mapped. For example, assume that a packet delay budget value of '100 ms' is mapped with a PPPP value of '1'. Then, the packet delay budget value of '100 ms' derived from the PPPP can be mapped to a packet delay budget value of '100 ms' for the PQI. Or, the packet delay budget value of '100 ms' derived from the PPPP can be mapped to packet delay budget values of '0ms' to '100 ms' for the PQI.

To determine a compatible mapping between the packet error rate for the PQI and the PPPR, it is possible to define a PPPR value or a range of PPPR values to which a packet error rate value or a range of packet error rate values for the PQI is mapped. For example, a packet error rate value of '$10^{-6}$' or '$10^{-5}$' may be mapped to a PPPR value of '1'. Or, packet error rate values of '$10^{-6}$' to '$10^{-5}$' may be mapped to a PPPR value of '1'.

To determine a compatible mapping between PQI values (corresponding to 5QI values in Table 1) and the PPPP or the PPPR, it is possible to define a PPPP value and/or a PPPR value to which a PQI value is mapped. For example, a PQI value of '1' may be mapped to a PPPP value of '1' and/or a PPPR value of '5'.

The information on the mapping between the LTE QoS model (PPPP/PPPR) and the NR QoS model (PQI) can be specified in various ways as described above. The mapping information between the LTE QoS model and the NR QoS model may be transferred to the terminal through at least one of the procedures illustrated in FIG. 3, FIG. 10, FIG. 11, and FIG. 12.

In one embodiment, the V2X AS may provide the mapping information shown in FIG. 9 to the V2X terminal (UE) by using the procedure depicted in FIG. 3.

In one embodiment, the V2X AS may provide the mapping information shown in FIG. 9 to the V2X terminal (UE) by using the procedure depicted in FIG. 10.

With reference to FIG. 10, the V2X AS 1015 may provide the V2X control function 1013 being the NF for providing the V2X service with information on the mapping between the V2X applications and the RAT types shown in FIG. 9 (step 1020). The V2X control function 1013 may forward the mapping information to the terminal 1010 (step 1030). Here, the V2X control function 1013 may send the mapping information to the terminal 1010 by using a user plane data message. When the mapping information is transmitted using a user plane message, the data is transferred from the V2X control function 1013 to the UPF (not shown) and then is transmitted from the UPF to the terminal 1010 via the (R)AN (not shown). Alternatively, the V2X control function 1013 can send the mapping information to the terminal 1010 by using a NAS signaling message of the control plane. When the mapping information is transferred using a control plane message, the signaling data may be transferred from the V2X control function 1013 to the PCF (not shown) and then be transmitted from the PCF to the terminal 1010 via the AMF (not shown) and the (R)AN, or the signaling data may be transferred from the V2X control function 1013 to the AMF without passing through the PCF and then be transferred from the AMF to the terminal 1010 via the (R)AN. Upon receiving the mapping information, the terminal 1010 may transmit a response message to the V2 control function 1013 (step 1040), and the V2 control function 1013 can forward the response message to the V2X AS 1015 (step 1050).

In one embodiment, the V2X terminal 1110 may use the procedure depicted in FIG. 11 to send a request for information on the mapping between the V2X applications and the RAT types shown in FIG. 9 to the V2X AS 1115. Specifically, the terminal 1110 may send the V2X AS 1115 a request message for information on the mapping between the V2X applications and the RAT types (via the V2X control function 1113) (steps 1120 and 1130). Upon receiving the request message, the V2X AS 1115 may transmit a response message containing the requested mapping information to the terminal 1110 (via the V2X control function 1113) (steps 1140 and 1150).

With reference to FIG. 3, the V2X service parameter information provided by the V2X AS 301 may be stored in the UDR 304 via the NEF 302. Additionally, in one embodiment, the V2X terminal 1210 can use the procedure depicted in FIGS. 12A to 12C to acquire the mapping information illustrated in FIG. 9 during the registration process.

Next, a description is given of a process in which the V2X service parameter information provided by the AS 301 is stored in the UDR 304 or 1217 with reference to FIG. 3.

In FIG. 3, the V2X AS 301 may provide the V2X service parameters managed by it to the NEF 302 (step 310). Here, the communication between the V2X AS 301 and the NEF 302 can be performed via the Nnef service based interface shown in FIG. 1 or the N33 reference point shown in FIG. 2. The V2X service parameters may include information on the mapping between V2X service types and RAT types. That is, the V2X AS 301 can generate information specifying the RAT type through which each V2X service illustrated in FIG. 9 can be provided. The generated mapping information between V2X service types and RAT types can be transmitted by the V2X AS 301 to the NEF 302.

The NEF 302 may store the V2X service parameters including the mapping information between V2X service types and RAT types received from the V2X AS 301 in the UDR 304 or 1217 (steps 320, 325, 330 and 335). Here, it is possible to use Option A in which the NEF 302 stores the V2X service parameters in the UDR 304 or 1217 via the UDM 303 (steps 320 and 325) and Option B in which the NEF 302 directly stores the V2X service parameters in the UDR 304 (steps 330 and 335).

In Option A, the communication between the NEF 302 and the UDM 303 may be performed using the Nudm service-based interface shown in FIG. 1, and the communication between the UDM 303 and the UDR 304 or 1217 may be performed via the Nudr service-based interface shown in FIG. 1 or via the N101 reference point shown in FIG. 2. For example, the NEF 302 may transmit a message (e.g., Nudm_ParameterProvision_Update Request) containing the V2X service parameters received from the V2X AS 301 to the UDM 303, and the UDM 303 may transmit a message (e.g., Nudr_DM_Update Request) containing the V2X service parameters received from the NEF 302 to the UDR 304 or 1217 (step 320). Then, as a reply, the UDR 304 or 1217 may transmit a response message (e.g., Nudr_DM_Update Response) to the UDM 303, and the UDM 303 may transmit a response message (e.g., Nudm_ParameterProvision_Update Response) to the NEF 302 (step 325).

In Option B, the communication between the NEF 302 and the UDR 304 or 1217 may be performed via the Nudr service-based interface shown in FIG. 1. For example, the NEF' 302 may transmit a message (e.g., Nudr_DM_Update Request) containing the V2X service parameters received from the V2X AS 301 to the UDR 304 or 1217 (step 330).

Then, as a reply, the UDR 304 or 1217 may transmit a response message (e.g., Nudr_DM_Update Response) to the NEF 302 (step 335).

In one embodiment, after storing the V2X service parameters in the UDR 304 or 1217, the NEF 302 can notify the V2X AS 301 of whether the parameter information is successfully updated (step 340).

Meanwhile, the V2X AS 301 can dynamically change the mapping information between V2X service types and RAT types. When the mapping information is changed, the V2X AS 301 can transmit the changed information to the UDR 304 or 1217 to store the changed information in the UDR 304 or 1217.

In one embodiment, when the V2X service parameter information is updated in the UDR 304 or 1217, the UDR 304 or 1217 can notify the PCF 305 or 1215 of the updated information (step 345). To this end, the PCF 305 or 1215 may request an event subscription to the UDR 304 or 1217 in advance. The types of events requested by the PCF 305 or 1215 to the UDR 304 or 1217 may include updating the policy information of the V2X service, updating the UE policy information related to the V2X service, updating the policy information of the terminal, and the like. Here, the communication between the UDR 304 or 1217 and the PCF 305 or 1215 may be performed via the Nudr service-based interface shown in FIG. 1.

In one embodiment, upon receiving the updated V2X service parameter information of the terminal 307 or 1210 from the UDR 304 or 1217, the PCF 305 or 1215 may process the corresponding information and store the processed information in the UDR 304 or 1217 again (step 375).

Next, a description is given of a method for the V2X terminal 307 or 1210 to obtain information on the mapping between V2X service types and RAT types from the UDR 304 or 1217 with reference to FIG. 12A.

With reference to FIG. 12A, upon receiving a registration request message from the terminal 1210 (via the (R)AN 1211) (steps 1220 and 1225 in FIG. 12A), the AMF 1213 may transmit a request for policy information associated with the terminal 1210 to the PCF 1215 (step 1230 in FIG. 12A).

In this case, the terminal 1210 may transmit a registration request message including the UE capability information and/or the UE policy container (V2X policy) information to the (R)AN 1211. The (R)AN 1211 can forward the registration request message received from the terminal 1210 to the AMF 1213. Here, if the terminal 1210 supports the V2X service, information indicating that the terminal supports the V2X service may be included in the UE capability information sent to the AMF 1213. Information indicating that the terminal 1210 supports the PC5 communication may be included in the UE LTE PC5 capability and UE NR PC5 capability information sent to the AMF 1213.

Upon determining that the terminal supports the V2X service according to the UE capability information received from the terminal, the AMF 1213 can select the PCF 1215 supporting the V2X service. Then, the AMF 1213 may make a request for policy information associated with the terminal 1210 to the selected PCF 1215 (step 1230 in FIG. 12A). The policy information associated with the terminal 1210 may include the mapping information between V2X service types and RAT types. The message of step 1230 in FIG. 12A may include the UE policy container (V2X policy) information received by the AMF 1213 from the terminal 1210.

The PCF 1215 may make a request for the VDR service parameters to be applied to the terminal 1210 to the UDR 1217 (step 1235 in FIG. 12A).

The UDR 1215 may provide the V2X service parameters stored at steps 320, 325, 330 and 335 of FIG. 3 to the PCF 1215 (step 1240 in FIG. 12A). The mapping information illustrated in FIG. 9 may be included in the V2X service parameters.

Meanwhile, the UDR 1215 may store the UE subscription information and/or UE capability information of the terminal 1210. The UE subscription information may include information on the slice (subscribed S-NSSAIs) to which the terminal 1210 has subscribed. The UE capability information may include information regarding the RAT type (e.g., LTE or NR) supported by the terminal 1210, the communication scheme (e.g., LTE PC5, NR PC5, or Uu) supported by the terminal 1210, the service (e.g., V2X over LTE PC5, V2X over NR PC5, or V2X over Uu) supported by terminal 1210.

The PCF 1215 may receive the UE subscription information and UE capability information of the terminal 1210 from the UDR 1215 at step 1240. To this end, the PCF 1215 can make a request for subscription information, including the terminal ID (e.g., SUPI) and information on the network (e.g., LTE, NR, or non-3gpp) to which the terminal 1210 is currently connected, to the UDR 1217 at step 1235. Then, the UDR 1217 checks whether subscription information corresponding to the ID of the terminal 1210 is stored. If it is stored, the UDR 1217 can transmit the subscription information of the terminal 1210 to the PCF 1215.

Alternatively, the PCF 1215 may receive the UE subscription information and UE capability information of the terminal 1210 from the UDR 1215 at step 1230. The procedure by which the AMF 1213 receives the UE capability information and/or UE subscription information from the UDM 1907 is shown in FIG. 19. With reference to FIGS. 12A and 19, upon receiving the registration request message from the UE 1210 or 1901 (1225 or 1920), the AMF 1213 or 1905 may transmit a UE subscription request message to the UDM 1907 (1930). The UDM 1907 may transmit a request message for UE subscription information to the UDR 1217 or 1909 (1940). This request message may include information identifying the terminal 1210 or 1901 (e.g., SUPI, 5G-GUTI, or IMSI). The UDR 1217 or 1909 may return a DM query response message including the subscription information of the terminal 1210 or 1901 to the UDM 1907 (1950). Upon receiving the UE subscription information, the UDM 1907 can return a UE subscription response message to the AMF 1213 or 1905 (1960). The UE subscription response message may include at least one of V2X service authentication information of the terminal 1210 or 1901, V2X capability information of the terminal 1210 or 1901, PC5 LTE capability information of the terminal 1210 or 1901, PC5 NR capability information of the terminal 1210 or 1901, or subscription information of the terminal 1210 or 1901. Upon receiving the UE subscription information, the AMF 1213 or 1905 can transmit a policy association establishment request message to the PCF 1215 (1230). The policy association establishment request message may include the subscription information of the terminal 1210 or 1901 and the capability information of the terminal 1210 or 1901. The procedure by which the PCF 1215 receives the UE capability information and/or the UE subscription information from the AMF 1213 may be performed through step 1230 or through a separate operation.

The PCF 1215 may provide policy information to be applied to the terminal 1210 to the AMF 1213 (step 1245 in FIG. 12A), where the V2X service parameters received from the UDR 1217 may be included in the policy information and the V2X service parameters may include the mapping information between V2X service types and RAT types. The AMF 1213 or 1905 may receive the UE subscription and/or the UE capability information from the UDM 1907 (step 1960 in FIG. 19).

The AMF 1213 may transmit a registration accept message including the V2X service parameter information received from the PCF 1215 to the terminal 1210 (step 1250 in FIG. 12A). The V2X service parameter information included in the registration accept message may include a service ID (e.g., PSID or ITS-AID) designating the V2X service and a corresponding destination layer-2 ID, packet priority information (e.g., ProSe Per-Packet Priority (PPPP)) and corresponding packet delay budget information, a list of V2X services requiring privacy, and information on the V2X service type (e.g., V2V, V2P, V2I or V2N) or a V2X service ID (e.g., PSID or ITS-AID) and V2X frequency available for the service. The V2X service parameter information may include at least one of the mapping information between V2X service types and RAT types or mapping information between the LTE QoS model and the NR QoS model.

Meanwhile, the UE policy information including mapping information between V2X service types and RAT types transmitted to the terminal may be optimized in the PCF 1215 or the AMF 1213.

To this end, based on the UE capability information (e.g., V2X capability, PC5 LTE capability, or PC5 NR capability) received from the terminal 1210, and the UE capability information and/or UE subscription information received from the UDM 1907, the AMF 1213 can optimize the UE policy information received from the PCF 1215. Here, the AMF 1213 can optimize the mapping information between V2X service types and RAT types received from the PCF 1215. Then, the AMF 1213 can transmit the UE policy information including the optimized mapping information between V2X service types and RAT types to the terminal 1210.

Alternatively, based on the UE capability information and/or the UE subscription information received from the AMF 1213 or the UDR 1217, the PCF 1215 can optimize the mapping information between V2X service types and RAT types received from the UDR 1217. Then, the PCF 1215 can transmit the UE policy information including the optimized mapping information between V2X service types and RAT types to the AMF 1213, and the AMF 1213 can forward the UE policy information to the terminal 1210.

Here, the optimization of the mapping information between V2X service types and RAT types may indicate the modification of the mapping information between V2X service types and RAT types according to, for example, the RAT type (e.g., LTE or NR) supported by the terminal 1210, the communication scheme (e.g., LTE PC5, NR PC5, Uu, or Uu multicast-broadcast) supported by the terminal 1210, the services (e.g., V2X over LTE PC5, V2X over NR PC5, and V2X over Uu) supported by terminal 1210, and the information on the slice to which the terminal 1210 has subscribed (Subscribed S-NSSAIs). For example, if the terminal 1210 supports the V2X service only via LTE, the mapping information between V2X service types and RAT types can be modified so that the RAT type is mapped only to LTE regardless of the V2X service type.

FIG. 12B depicts another procedure in which the V2X terminal 307 or 1210 obtains the mapping information between V2X service types and RAT types. In the embodiment of FIG. 12B, the terminal 307 or 1210 can obtain the UE policy information by using a UE configuration update procedure.

With reference to FIG. 12B, the PCF 1215 or 305 may determine to update the UE policy information (step 1260 in FIG. 12B). The PCF 1215 or 305 may receive the updated V2X service parameter information of the terminal from the UDR 304 or 1217 and store it as described at step 345 in FIG. 3.

Here, the PCF 1215 or 305 may determine whether to update the UE policy information during, the initial registration of the terminal 1210 or 307, or when the network triggers the need for updating the UE policy information after initial registration. For example, the PCF 1215 or 305 may determine during the initial registration whether the UE policy information is to be updated according to the UE policy container (V2X policy) information, and the policy information associated with the access selection and the PDU selection of the terminal (which may be included in the Npcf_UEPolicyControl_Create request, for example) received from the AMF 1213. Or, the PCF 1215 or 305 can determine whether the UE policy information is to be changed when an event occurs, such as a change in the location of the terminal 1210 or 307 or a change in the subscription information of the terminal 1210 or 307 (e.g., a change in the slice (subscribed S-NSSAI) to which the terminal 1210 or 307 has subscribed). Additionally, the PCF 1215 or 305 may determine to transmit the V2X service parameter information received from the UDR 304 or 1217 to the terminal 1210 or 307 as described at step 350 of FIG. 3.

The PCF 1215 or 305 may transmit the V2X service parameter information to the AMF 1213 or 306 (step 1265). Here, the V2X service parameter information may include at least one of mapping information between V2X service types and RAT types or mapping information between the LTE QoS model and the NR QoS model. In one embodiment, the V2X parameter information may be included in the NamfCommunication_N1N2MessageTransfer message for transmission to the AMF 1213 or 306. The NamfCommunication_N1N2MessageTransfer message may include the SUPI and UE policy container.

If the terminal 1210 or 307 is registered in the network and can be serviced, the AMF 1213 or 306 may determine to forward the UE policy information received from the PCF 1215 or 305 to the terminal 1210 or 307 (step 1270). If the terminal 1210 or 307 is registered to one of the 3GPP access network and the non-3GPP access network, the AMF 1213 or 306 can transmit the UE policy information to the terminal 1210 or 307 through the access network to which the terminal 1210 or 307 is registered and connected. If the terminal 1210 or 307 is registered in both the 3GPP access network and the non-3GPP access network and is connectable, the AMF 1213 or 306 may transmit the UE policy information to the terminal 1210 or 307 by selecting a specific access network according to the local policy of the AMF 1213 or 306. If the terminal 1210 or 307 is registered in or connected to none of the 3GPP access network and the non-3GPP access network, the AMF 1213 or 306 can notify the PCF 1215 or 305 of UE policy transmission failure (e.g., Namf_Communication_N1N2TransferFailureNotification) (step 1285). Upon determining to transmit the UE policy information through the 3GPP access network to the terminal 1210 or 307, if the terminal 1210 or 307 is in the CM-IDLE state, the AMF 1213 or 306 may initiate a paging procedure by sending a paging message to the terminal 1210 or 307 (network triggered service request). Upon receiving the paging message, the terminal 1210 or 307 can perform the paging procedure.

The AMF 1213 or 306 may transmit the UE policy information to the terminal 1210 or 307 (step 1275). Here, the UE policy information may include at least one of the mapping information between V2X service types and RAT types, or the mapping information between the LTE QoS model and the NR QoS model.

Meanwhile, the UE policy information including the mapping information between V2X service types and RAT types transmitted to the terminal may be optimized in the PCF 1215 or 305 or the AMF 1213 or 306.

To this end, the AMF 1213 or 306 may optimize the V2X service policy information of the terminal received from the PCF 1215 or 305 based on the UE capability information and/or the UE subscription information received from the UDM 1907. Here, the AMF 1213 or 306 can optimize the mapping information between V2X service types and RAT types received from the PCF 1215 or 305. Then, the AMF 1213 or 306 may transmit the terminal 1210 or 307 the UE policy information including at least one of the optimized mapping information between V2X service types and RAT types or the mapping information between the LTE QoS model and the NR QoS model.

Alternatively, based on the UE capability information and/or the UE subscription information received from the AMF 1213 or 306 or the UDR 1217 or 304, the PCF 1215 or 305 can optimize the mapping information between V2X service types and RAT types received from the UDR 1217 or 304. Then, the PCF 1215 or 305 may transmit the AMF 1213 or 306 the UE policy information including at least one of the optimized mapping information between V2X service types and RAT types or the mapping information between the LTE QoS model and the NR QoS model, and the AMF 1213 or 306 may transmit the UE policy information to the terminal 1210 or 307.

Upon receiving the UE policy information, the terminal 1210 or 307 may store the received UE policy information, and may transmit a response message indicating successful information reception to the AMF 1213 or 306 (step 1280).

Then, the AMF 1213 or 306 may notify the PCF 1215 or 305 that the V2X service parameter information has been successfully transmitted to the terminal 1210 or 307 (step 1285). This message can be a Namf_N1MessageNotify message. The PCF 1215 or 305 can maintain the UE policy information and notify the UDR 1217 or 304 of the updated UE policy information.

FIG. 12C depicts another procedure by which the V2X terminal 307 or 1210 obtains the mapping information between the V2X service type and the RAT type and the mapping information between the LTE QoS model and the NR QoS model. In the embodiment of FIG. 12C, the terminal 307 or 1210 may trigger the acquisition of the UE policy information (UE triggered).

With reference to FIG. 12C, the terminal 1210 or 307 may transmit a request message for UE policy information to the AMF 1213 or 306 (step 1290). This request message may be a UE policy provisioning request message, and the UE policy provisioning request message may include a UE policy container (V2X policy).

The AMF 1213 or 306 may transmit a request message for UE policy information to the PCF 1215 or 305 (step 1295). The request message may be an Npcf_UEPolicyControl_Update request, and this message may include a UE policy container received from the terminal.

Upon receiving the request message for the UE policy information, the PCF 1215 or 305 may determine whether the UE policy information is to be updated (step 1260).

Steps 1260 to 1285 may be similar to the operations described in connection with FIG. 3C.

Namely, the PCF 1215 or 305 may transmit the UE policy information to the AMF 1213 or 306 (step 1265), and the AMF 1213 or 306 may forward the UE policy information to the terminal 1210 or 307 (steps 1270 and 1275). Then, as a reply, the terminal 1210 or 307 may transmit a response message to the AMF 1213 or 306 (step 1280), and the AMF 1213 or 306 may send a message indicating the success or failure of UE policy transmission to the PCF 1215 or 305 (step 1285).

Figure 13:
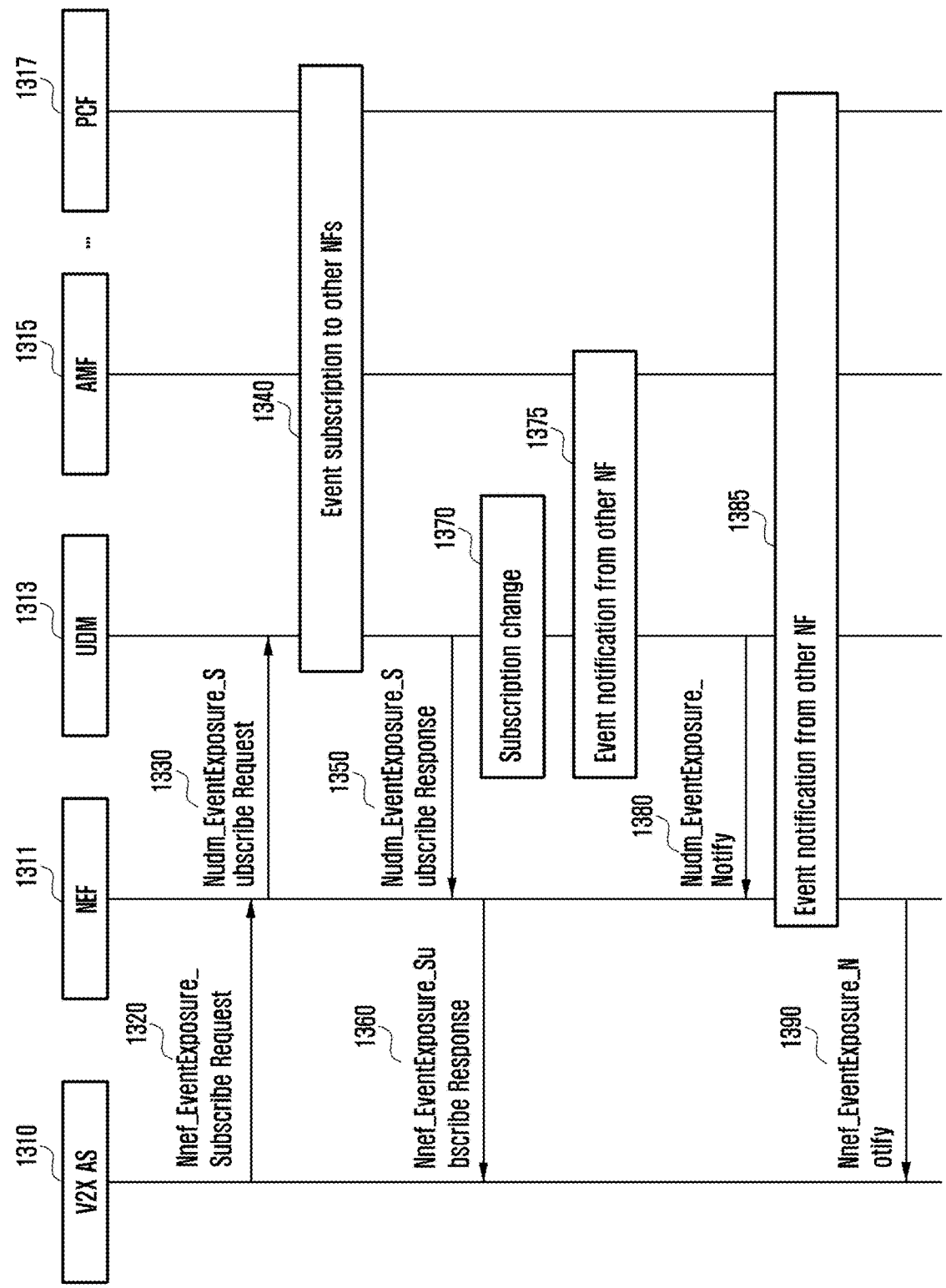
FIG. 13 depicts a procedure for the V2X AS to obtain information on the terminal and V2X service from the network according to an embodiment of the disclosure.

FIG. 13 depicts a procedure for the V2X AS to obtain information on the terminal and V2X service from the network according to an embodiment of the disclosure.

With reference to FIG. 13, to receive a changed information notification when an event occurs in relation to the terminal and the V2X service, the V2X AS 1310 may transmit an event exposure subscribe request message to the NEF 1311 (step 1320). The NEF 1311 may forward the event exposure subscribe request message received from the V2X AS 1310 to the UDM 1313 (step 1330). Based on the request message, the UDM 1313 may transmit an event subscription request to the associated NFs (e.g., AMF 1315, PCF 1317, and SMF) (step 1340). The UDM 1313 may send an event exposure subscribe response message indicating the success or failure of making the event subscription request to the NEF 1311 (step 1350), where the information related to the terminal and the V2X service may be included in the response message. The NEF 1311 can forward the response message received from the UDM 1313 to the V2X AS 1310 (step 1360). When the subscription information of the terminal is changed (step 1370) or an event notification is received from another NF to which an event subscription has been made at step 1340 (step 1375), the UDM 1313 can notify the NEF 1311 of the corresponding changed information (step 1380). The NEF 1311 may directly receive an event notification from another NF without passing through the UDM 1313 (step 1385). Upon receiving an event notification message from the UDM 1313 or another NF, the NEF 1311 may notify the V2X AS 1310 of the corresponding changed information (step 1390). According to the above procedure, the V2X AS 1310 can obtain information related to the terminal and the V2X service from the network, and obtain the changed information when a change is made to the above information. The terminal related information may include a RAT type available to the terminal. Based on the information about the RAT type available to the terminal obtained from the network, the V2X AS server 1310 may generate a mapping table specifying a mapping between the V2X applications and the RAT types as illustrated in FIG. 9.

In one embodiment, the PCF can select the appropriate RAT for each V2X service described above and manage information about the V2X service and associated RAT. In this case, the PCF can manage the mapping table between the V2X services and the RAT types as illustrated in FIG. 9. FIG. 12A shows a procedure in which the PCF provides mapping information between the V2X applications and the RAT types shown in FIG. 9 to the V2X terminal performing the registration procedure. Upon receiving a registration request message from the terminal 1210, the AMF 1213 may send a request for policy information related to the terminal 1210 to the PCF 1215 (step 1230 in FIG. 12A). The PCF 1215 may send a request for the V2X service parameters to be applied to the terminal 1210 to the UDR 1217 (step 1235 in FIG. 12A). The UDR 1217 may provide the stored V2X service parameters to the PCF 1215 (step 1240). The mapping information illustrated in FIG. 9 may be included in the V2X service parameters. If the PCF 1215 stores the V2X service parameter information, steps 1235 and 1240 of FIG. 12A may be skipped. The PCF 1215 may provide policy information to be applied to the terminal 1210 to the AMF 1213 (step 1245), where the policy information may include the V2X service parameters. The mapping information illustrated in FIG. 9 may be included in the V2X service parameters. The AMF 1213 may transmit the terminal 1210 a registration accept message including the V2X service parameter information received from the PCF 1215 (step 1250).

In one embodiment, the mapping information shown in FIG. 9 may be pre-configured in the terminal, and the terminal can use the preset mapping information.

In one embodiment, the PCF can manage the mapping information between the LTE QoS model and the NR QoS model described above.

In one embodiment, the mapping information between the LTE QoS model and the NR QoS model described above may be pre-configured in the terminal, and the terminal can use the preset mapping information.

In one embodiment, when sending a V2X message based on the mapping information shown in FIG. 9, the terminal can select the RAT type mapped to the corresponding V2X application to transmit the V2X message.

Figure 14:
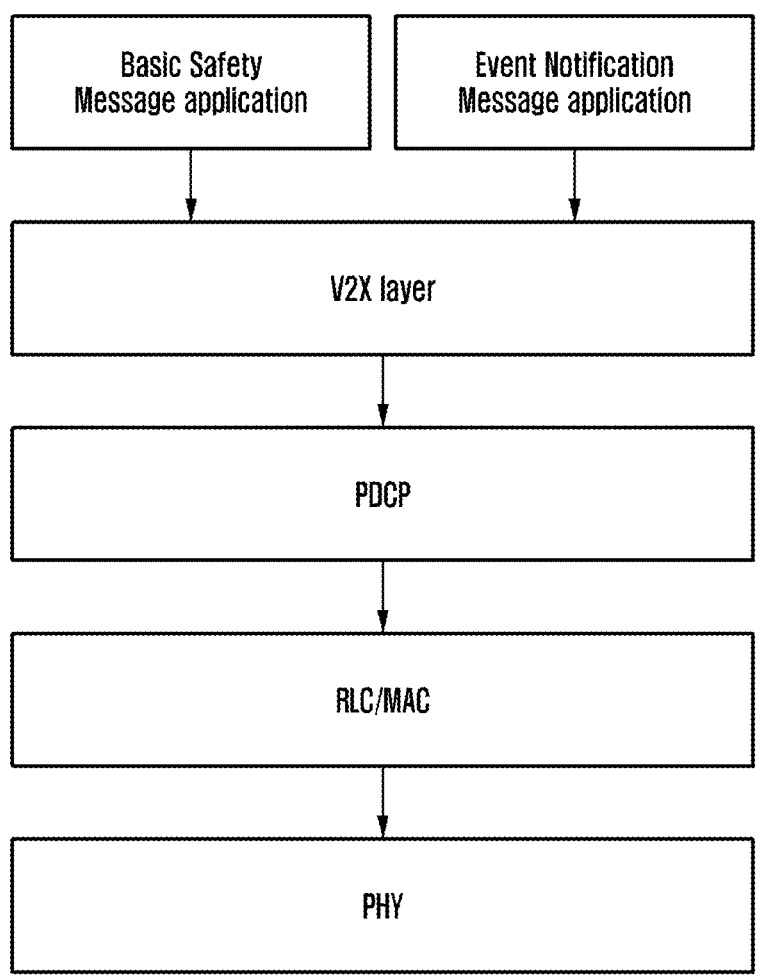
FIG. 14 illustrates a method for the terminal to select an appropriate RAT type for a specific V2X application according to an embodiment of the disclosure.

FIG. 14 illustrates operations of the terminal according to an embodiment of the disclosure. That is, FIG. 14 illustrates a method for the terminal to select an appropriate RAT type for a specific V2X application. FIG. 15 shows an example of a mapping between V2X services and frequency bands according to an embodiment of the disclosure.

With reference to FIG. 14, in a state where the terminal is using a basic safety message service and an event notification message service, when the terminal's basic safety message application generates a message and forwards it to the V2X layer, the V2X layer may select LTE as the RAT to transmit the basic safety message based on the mapping information shown in FIG. 9, and may forward the received basic safety message and the selected RAT information to the lower layer (PDCP). When the terminal's event notification message application generates a message and forwards it to the V2X layer, the V2X layer may select NR as the RAT to transmit the event notification message based on the mapping information shown in FIG. 9, and may forward the received event notification message and the selected RAT information to the lower layer (PDCP). The RLC, MAC and PHY layers of the terminal can transmit the corresponding message via the RAT selected by the V2X layer.

With reference to FIG. 9, it is possible to select the appropriate RAT for a V2X application based on the V2X service and the RAT type mapped thereto. It is also possible to select the appropriate RAT for a V2X application based on the V2X service and the frequency band mapped thereto. FIG. 15 illustrates a mapping between V2X services and frequency bands. For example, in the case of a basic safety message service, the V2X service ID is '0' and the terminal can select a frequency band of 1 to 100 MHz to transmit a basic safety message. In the case of an event notification message service, which may be used by a V2X terminal in the event of an emergency to notify a nearby V2X terminal of a dangerous situation, the V2X service ID is '1' and the terminal can select a frequency band of 100 to 200 MHz to transmit an event notification message. In the case of an extended sensors service, the V2X service ID is '2' and the terminal can transmit an extended sensor service message through a 5.9 GHz frequency band. The mapping between service types and frequency bands shown in FIG. 15 is an example for describing the disclosure, and does not mean that the basic safety message service is available only in the frequency band of 1 to 100 MHz. Which frequency band is mapped to which V2X service type or V2X ID can be determined by the V2X service provider providing the V2X services.

In applying the disclosure, the mapping information shown in FIG. 15 can be used in place of or in combination with the mapping information shown in FIG. 9.

Figure 16:
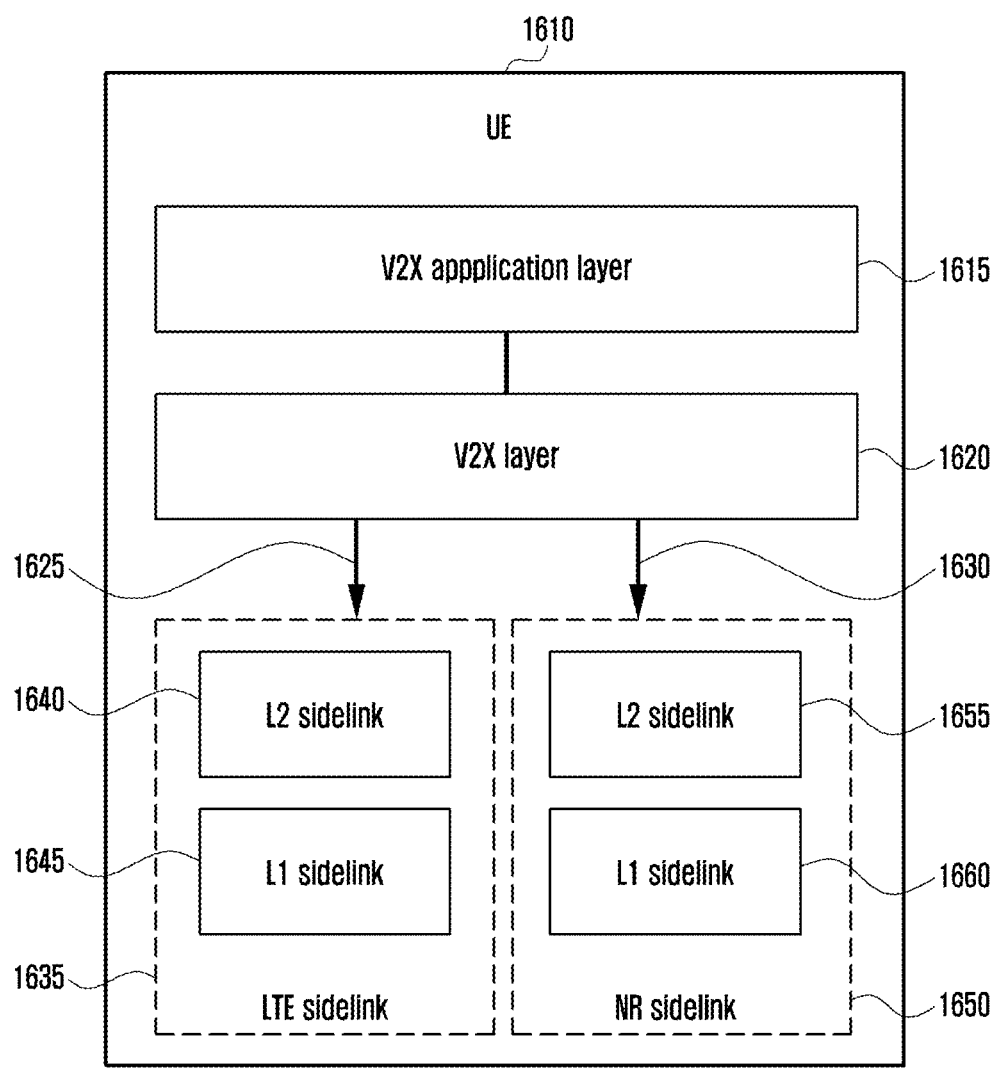
FIG. 16 illustrates a protocol stack and operation of the V2X terminal according to an embodiment of the disclosure.

FIG. 16 illustrates a protocol stack and operation of the terminal 1610 according to an embodiment of the disclosure.

With reference to FIG. 16, the terminal 1610 may include an LTE sidelink 1635 and an NR sidelink 1650. The LTE sidelink 1635 may be composed of an L1 sidelink 1645 and an L2 sidelink 1640. The L1 sidelink 1645 may be composed of a PHY layer. The L2 sidelink 1640 may be composed of the MAC layer, the RLC layer, and the PDCP layer. The NR sidelink 1650 may be composed of an L1 sidelink 1660 and an L2 sidelink 1655. The L1 sidelink 1660 may be composed of a PHY layer. The L2 sidelink 1655 may be composed of the MAC layer, the RLC layer, the PDCP layer, and the SDAP layer. The LTE sidelink 1635 and the NR sidelink 1650 may belong to the AS (access stratum) layer.

The V2X application layer 1615 of the terminal 1610 may generate a V2X message, and may transmit to the V2X layer 1620 the V2X message, the corresponding V2X service ID, the desired QoS requirements, and the required communication mode. Here, the V2X service ID corresponds to the packet of the V2X message, and may include a PSID or an ITS-AID. The desired QoS requirements may include the QoS information (e.g., PPPP/PPPR or PQI) required to transmit the packet of the V2X message. The required communication mode may include at least one of PC5 broadcast, PC5 groupcast, or PC5 unicast. If the V2X application layer 1615 does not provide the communication mode information to the V2X layer 1620, the V2X layer 1620 may operate in the PC5 broadcast mode.

In one embodiment, when the V2X layer 1620 receives a request for the PC5 broadcast communication mode together with a V2X message from the V2X application layer 1615 or does not receive a request for a communication mode from the V2X application layer 1615, the V2X layer 1620 may perform a RAT type selection procedure to transmit the received message as described below.

In one embodiment, the V2X layer 1620 may store information on the mapping between V2X service IDs and RAT types shown in FIG. 9. Based on the received V2X message, the V2X service ID corresponding to the V2X message and the mapping information shown in FIG. 9, the V2X layer 1620 may determine the RAT to be used to transmit the V2X message received from the V2X application layer 1615.

For example, if the V2X service ID sent from the V2X application layer 1615 to the V2X layer 1620 indicates a basic safety message (BSM), the V2X layer 1620 may determine that the message should be sent via the LTE RAT. If a PPPP/PPPR value is received as the required QoS information from the V2X application layer 1615, the V2X layer 1620 may use the PPPP/PPPR value received from the application layer 1615 as a QoS value for transmitting the BSM message. If a PQI is received as the required QoS information from the V2X application layer 1615, the V2X layer 1620 may convert the PQI value received from the application layer 1615 to a PPPP/PPPR value based on the mapping information between the LTE QoS model and the NR QoS model stored in the terminal, and may use the calculated PPPP/PPPR value as a QoS value for transmitting the BSM message. The V2X layer 1620 may forward a message to the LTE L2 sidelink 1640 via the interface 1625 of the LTE modem. Here, the V2X layer 1620 may forward the V2X message packet and the PPPP/PPPR value to the AS layer (LTE L2 sidelink 1640). The V2X layer 1620 may notify the AS layer (LTE L2 sidelink 1640) of the communication mode (e.g., PC5 broadcast) required for message transmission. If the V2X layer 1620 does not provide communication mode information to the AS layer 1640, the AS layer 1640 may operate in the PC5 broadcast mode. Upon receiving the V2X message, the LTE L2 sidelink 1640 can transmit the received V2X message through the LTE L1 sidelink 1645 and the LTE PC5 interface.

As another example, if the V2X service ID sent from the V2X application layer 1615 to the V2X layer 1620 indicates an event notification message (ENM), the V2X layer 1620 may determine that the message should be sent via the NR RAT. If a PQI value is received as the required QoS information from the V2X application layer 1615, the V2X layer 1620 may use the PQI value received from the application layer 1615 as a QoS value for transmitting the ENM message. If a PPPP/PPPR value is received as required QoS information from the V2X application layer 1615, the V2X layer 1620 may convert the PPPP/PPPR value received from the application layer 1615 to a PQI value based on the mapping information between the LTE QoS model and the NR QoS model stored in the terminal, and may use the calculated PQI value as the QoS value for transmitting the ENM message. The V2X layer 1620 may forward the message to the NR L2 sidelink 1655 through the interface 1630 of the NR modem. Here, the V2X layer 1620 may forward the V2X message packet and the PQI value to the AS layer (LTE L2 sidelink 1655). The V2X layer 1620 may notify the AS layer (LTE L2 sidelink 1655) of the communication mode (e.g., PC5 broadcast) required for message transmission. If the V2X layer 1620 does not provide the communication mode information to the AS layer 1655, the AS layer 1655 may operate in the PC5 broadcast mode. Upon receiving the V2X message, the NR L2 sidelink 1655 can transmit the received V2X message through the NR L1 sidelink 1660 and the NR PC5 interface.

In one embodiment, the V2X layer 1620 may use the UE policy information stored in the terminal to determine the RAT type to be used for transmitting a V2X message received from the V2X application layer 1615. The UE policy information stored in the terminal may include information specifying the communication channel (e.g., PC5 sidelink or Uu) and the RAT type (e.g., LTE or NR) available for each application ID, data flow ID, or service ID, the UE configuration information, the UE capability information, and the like.

Meanwhile, when the V2X layer 1620 determines that the RAT type matching the service type of the V2X message to be transmitted is both the LTE RAT and the NR RAT based on the mapping information between V2X service types and RAT types, the terminal can transmit the packet of the V2X message through both the LTE sidelink 1635 and the NR sidelink 1650. To transmit a message via the LTE RAT and the NR RAT, based on the required QoS information (e.g., PPPP/PPPR value or PQI value) received from the V2X application layer 1615 and the mapping information between the LTE QoS model and the NR QoS model stored in the terminal, the V2X layer 1620 may determine an appropriate QoS value for transmitting the packet of the V2X message (PPPP/PPPR value to send through the LTE RAT, or PQI value to send through the NR RAT) and provide the QoS value to the AS layer. In this case, the terminal 1610 can determine which of the transmission of the V2X message through LTE and the transmission of the V2X message through NR is to be performed first in consideration of the channel states of the LTE RAT and the NR RAT, and the priorities of LTE and NR. Alternatively, the transmission of the V2X message via LTE and the transmission of the V2X message via NR may be performed simultaneously.

Alternatively, in one embodiment, when the V2X layer 1620 determines that the RAT type matching the service type of the V2X message to be transmitted is both the LTE RAT and the NR RAT based on the mapping information between V2X service types and RAT types, the terminal can select one of the two RAT types to transmit the V2X message. To this end, the V2X layer 1610 can receive, as feedback information, channel state information of both RATs from the AS layers 1635 and 1650. Based on the feedback information, the V2X layer 1610 can select one RAT. To transmit a message via the selected RAT, based on the required QoS information (e.g., PPPP/PPPR value or PQI value) received from the V2X application layer 1615 and the mapping information between the LTE QoS model and the NR QoS model stored in the terminal, the terminal may determine an appropriate QoS value for transmitting the packet of the V2X message (PPPP/PPPR value to send through the LTE RAT, or PQI value to send through the NR RAT) and provide the QoS value to the corresponding AS layer. The AS layers 1635 and 1650 may determine a RAT to be used to transmit the packet of the V2X message among the LTE RAT and the NR RAT, and transmit information indicating the determined RAT to the V2X layer 1610. Then, the V2X layer 1610 may select the RAT indicated by the AS layers 1635 and 1650 to send packets of the V2X message via the selected RAT.

Figure 17:
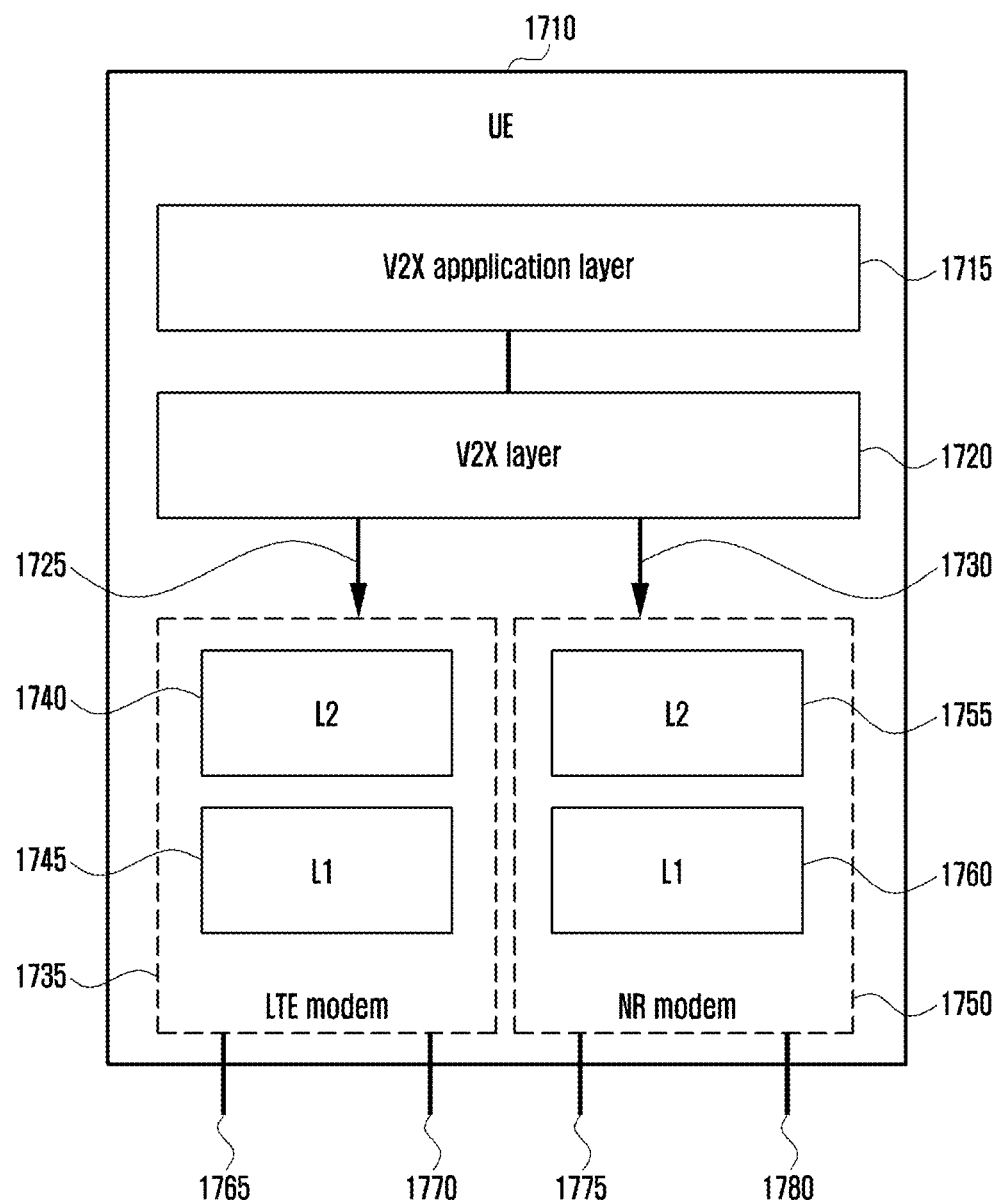
FIG. 17 illustrates a protocol stack and operation of the V2X terminal according to an embodiment of the disclosure.

FIG. 17 illustrates a protocol stack and operation of the terminal 1710 according to an embodiment of the disclosure.

With reference to FIG. 17, the terminal 1710 may include an LTE communication modem 1735 and an NR communication modem 1750. The LTE communication modem 1735 may include an L1 layer 1745 and an L2 layer 1740. The L1 layer 1745 may include the PHY layer. The L2 layer 1740 may include the MAC layer, the RLC layer, and the PDCP layer. The LTE communication modem 1735 may support an LTE Uu communication interface 1765 and an LTE PC5 communication interface 1770. The NR layer 1750 may include an L1 layer 1760 and an L2 layer 1755. The L1 layer 1760 may include the PHY layer. The L2 layer 1755 may include the MAC layer, the RLC layer, the PDCP layer, and the SDAP layer. The NR communication modem 1750 may support an NR Uu communication interface 1775 and an NR PC5 communication interface 1780. In one embodiment, the V2X application layer 1715 of the terminal 1710 may generate a V2X message and forward the V2X message and its corresponding application ID, data flow ID, or service ID to the V2X layer 1720. Based on the received V2X message, the application ID, data flow ID or service ID corresponding to the V2X message, and the UE policy information stored in the terminal, the V2X layer 1720 may determine the communication channel (e.g., PC5 sidelink or Uu) and the RAT type (e.g., LTE or NR) to be used to transmit the V2X message received from the V2X application layer 1715.

For example, the V2X layer 1720 can determine to transmit the V2X message received from the V2X application layer 1715 through the Uu link of the LTE RAT on the basis of the UE policy, and can transmit the V2X message and information indicating the communication channel to the LTE L2 1740 via the interface 1725 of the LTE modem. Upon receiving the V2X message, the LTE L2 1740 can transmit the received V2X message to the LTE L1 1745. The LTE L1 1745 may transmit the received message via the LTE Uu interface 1765 based on the information indicating the communication channel received from the V2X layer 1720.

Or, the V2X layer 1720 can determine to transmit the V2X message received from the V2X application layer 1715 through the PC5 link of the LTE RAT on the basis of the UE policy, and can transmit the V2X message and information indicating the communication channel to the LTE L2 1740 via the interface 1725 of the LTE modem. Upon receiving the V2X message, the LTE L2 1740 can transmit the received V2X message to the LTE L1 1745. The LTE L1 1745 may transmit the received message via the LTE PC5 interface 1770 based on the information indicating the communication channel received from the V2X layer 1720.

Alternatively, the V2X layer 1720 can determine to transmit the V2X message received from the V2X application layer 1715 through the Uu link of the NR RAT on the basis of the UE policy, and can transmit the V2X message and information indicating the communication channel to the NR L2 1755 via the interface 1730 of the NR modem. Upon receiving the V2X message, the NR L2 1755 can transmit the received V2X message to the NR L1 1760. The NR L1 1760 may transmit the received message via the NR Uu interface 1775 based on the information indicating the communication channel received from the V2X layer 1720.

Or, the V2X layer 1720 can determine to transmit the V2X message received from the V2X application layer 1715 through the PC5 link of the NR RAT on the basis of the UE policy, and can transmit the V2X message and information indicating the communication channel to the NR L2 1740 via the interface 1730 of the NR modem. Upon receiving the V2X message, the NR L2 1755 can transmit the received V2X message to the NR L1 1760. The NR L1 1760 may transmit the received message via the NR PC5 interface 1780 based on the information indicating the communication channel received from the V2X layer 1720.

Meanwhile, as described above, the terminal can select at least one of the LTE RAT or the NR RAT to transmit a V2X message according to the mapping information between V2X service types and RAT types. Here, if the NR RAT is selected, the terminal can transmit the V2X message via a groupcast. The terminal needs to perform a group management procedure to use a groupcast.

Figure 18A:
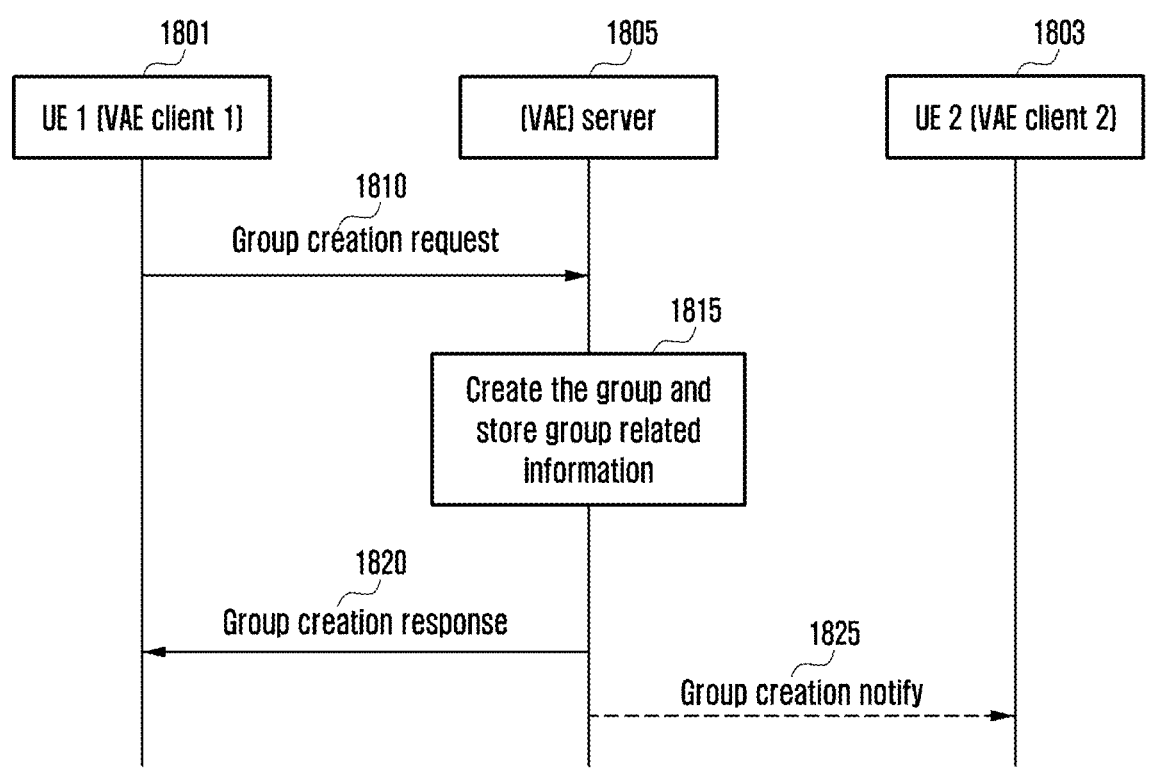
FIGS. 18A to 18C depict examples of a plurality of procedures for V2X group communication according to an embodiment of the disclosure.
Figure 18B:
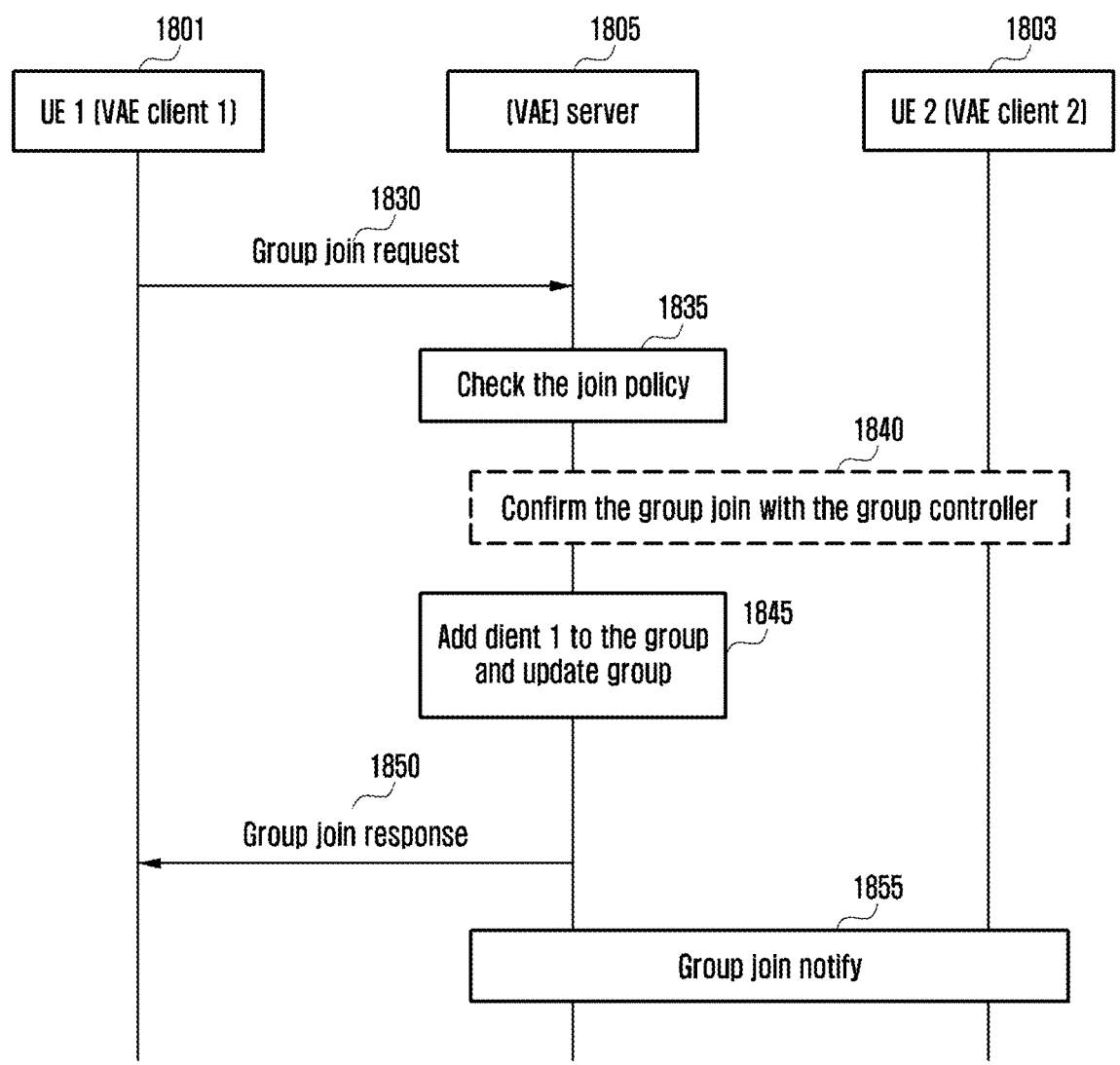
Figure 18C:
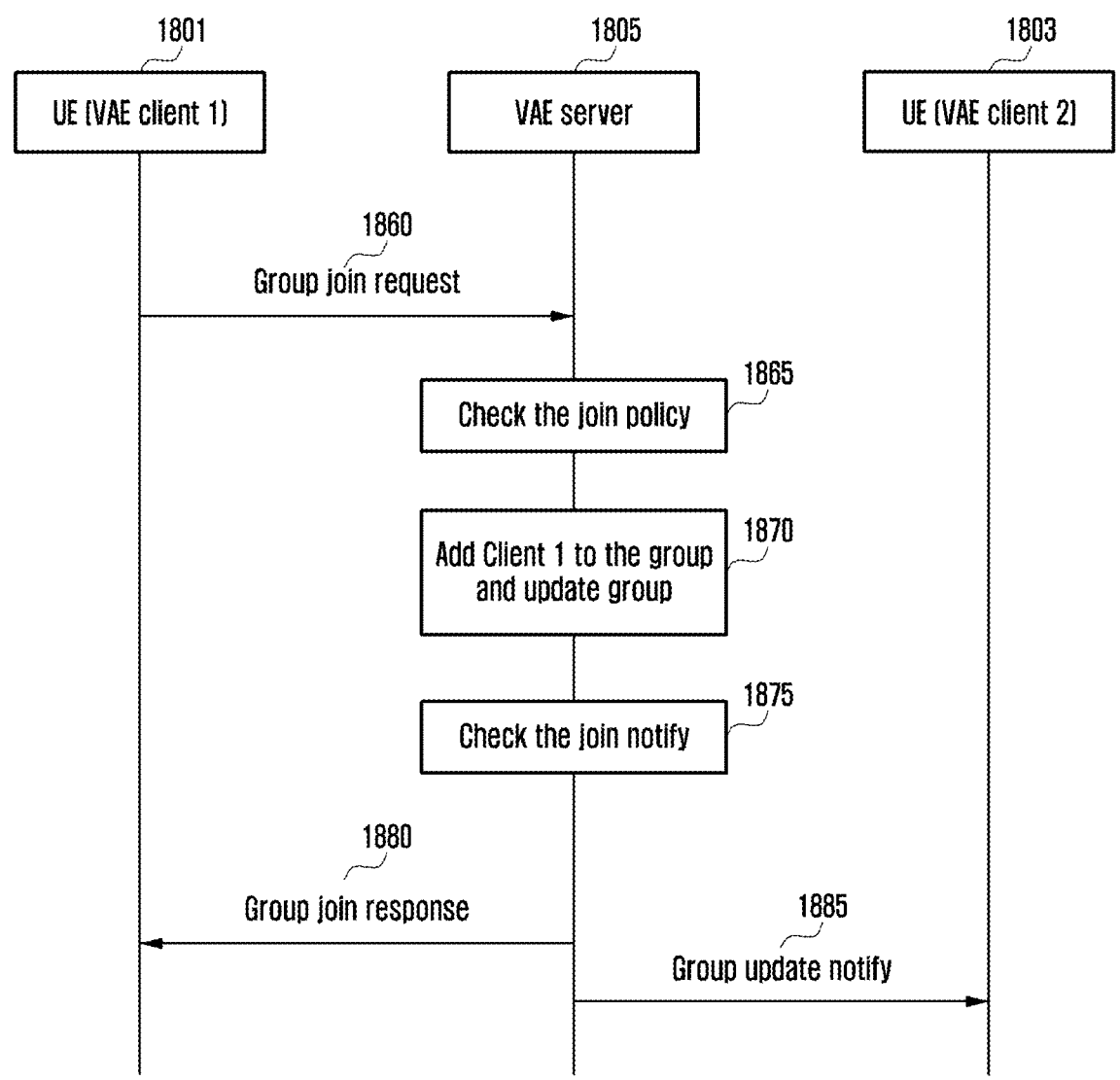

FIGS. 18A to 18C depict examples of a plurality of procedures for V2X group communication according to an embodiment of the disclosure.

To perform group communication, it may be necessary to configure a dedicated group so that V2X terminals can communicate with each other. To this end, a group creation procedure may be required first. The group creation procedure is a procedure for creating a new group without a group member so that terminals wishing to perform group communication can join the group.

With reference to FIG. 18A, UE 1 (V2X application enabler, VAE) 1801 may receive a group creation request. UE 1 (1801) may then trigger group creation. To this end, UE 1 (1801) may transmit a group creation request message to the VAE server 1805 (step 1810).

The (VAE) server 1805 can check whether UE 1 (1801) is an authorized terminal. If UE 1 (1801) is an authorized terminal, the server 1805 can examine the group policy (for example, if the request message at step 1810 includes a list of VAE clients, limitation on the maximum number of members allowed in the group, or limitation on the maximum number of groups that UE 1 (1801) can create). If the server 1805 determines that group creation is permitted after checking the group policy, the server 1805 may assign a unique group identity, and generate and store information on the group including information on group members, dynamic group leader information, the group join policy, and a ProSe layer-2 group identity that can be used directly for ProSe communication in the group (step 1815).

The VAE server 1805 may send a group creation response message to UE 1 (1801) (step 1820). Here, the VAE server 1805 may transmit the layer-2 identity and the generated group information to UE 1 (1801) together. In one embodiment, the VAE server 1805 may provide the group information to a corresponding V2X application specific server. UE 1 (1801) may receive the group information from the VAE server 1805 and provide the group information to a V2X application specific client.

In one embodiment, if the VAE client (i.e., group member) information is valid, the VAE server 1805 may transmit a group creation notification to UE 2 (1803) being a group member (step 1825).

When the group creation procedure for V2X group communication is completed according to the embodiment of FIG. 18A, the VAE server 1805 may have the group information. A terminal wishing to perform V2X group communication may want to join the group. This will be described with reference to FIGS. 18B and 18C.

With reference to FIG. 18B, the VAE server 1805 may store the group information. The VAE server 1805 may broadcast the group information in a related geographical area. Then, UE 1 (VAE client 1) 1801 having received the group information and may wish to join the group to perform group communication. Here, UE 2 (VAE client 2) 1803 may be the leader of the group.

If UE 1 (1801) is requested to join the group, UE 1 (1801) may transmit a group join request to the VAE server 1805 (step 1830). Upon receiving the request, the VAE server 1805 can check the group join policy including the maximum number of members allowed in the group (step 1835).

In one embodiment, if additional authorization from the dynamic group leader is required, the VAE server 1805 may request UE 2 (1803) selected as the group leader to approve the group join request and may receive a group join approval from UE 2 (1803) (step 1840).

If UE 1 (1801) satisfies the group join policy, the VAE server 1805 may add UE 1 (1801) having made a request to the group and update the group information (step 1845).

The VAE server 1805 may send a group join response to UE 1 (1801) (step 1850), where the group join response may include the group information and associated ProSe layer-2 group identity. The ProSe layer-2 group identity may be used as a destination layer-2 ID. For example, when a terminal belonging to the group for V2X group communication transmits data associated with the ProSe layer-2 group identity, another terminal belonging to the group can receive the data associated with the ProSe layer-2 group identity. Then, it can ignore the data transmitted with a layer-2 ID of another group.

The VAE server 1805 may notify other terminals (e.g., UE 2 (1803)) of the group that UE 1 (1801) has joined the group (step 1855).

With reference to FIG. 18C illustrating another embodiment of the group join procedure for a terminal, the VAE server 1805 may store the group information. The VAE server 1805 may broadcast the group information in a related geographical area. Then, UE 1 (VAE client 1) 1801 having received the group information may wish to join the group to perform group communication. Here, UE 2 (VAE client 2) 1803 may be the leader of the group. UE 2 (1803) may operate on both Uu and PC5.

If UE 1 (1801) is requested to join the group, UE 1 (1801) may transmit a group join request to UE 2 (1803) via PC5 (step 1860). Upon receiving the request, UE 2 (1803) can check the group join policy including the maximum number of members allowed in the group (step 1865).

If UE 1 (1801) satisfies the group join policy, UE 2 (1803) may add UE 1 (1801) having made a request to the group and update the group information (step 1870). Then, UE 2 (1803) may notify other terminals (e.g., UE 3 (not shown)) of the group that UE 1 (1801) has joined the group (step 1875). UE 2 (1803) may send a group join response to UE 1 (1801) (step 1880), where the group join response may include the group information and associated ProSe layer-2 group identity. UE 2 (1803) may then send a group update notification to the VAE server 1805 (step 1885).

Embodiment D

FIG. 19 depicts a procedure for V2X service authentication according to an embodiment of the disclosure.

With reference to FIG. 19, the terminal 1901 may transmit a registration request message to the network at the time of an initial attach or occurrence of a mobility event (step 1910).

The terminal 1901 may include an S-NSSAI indicating a V2X network slice (S-NSSAI for eV2X) in the requested NSSAI of the registration request message. The S-NSSAI may be composed of an SST (slice service type) and an SD (slice differentiator). The terminal 1901 may include a value indicating the vehicle communication service (V2X or eV2X) in the SST field of the S-NSSAI for eV2X. In addition, the terminal 1901 may include a value indicating the mode of the terminal 1901 (vehicle UE or pedestrian UE) in the SD field of the S-NSSAI for eV2X.

The terminal 1901 may include information about the function (UE 5GMM Core Network Capability) supported by the terminal 1901 in the registration request message. When the terminal 1901 supports the function "V2X over LTE PC5", the terminal 1901 may include a V2X over LTE PC5 capability indication in the UE 5GMM Core Network Capability. If the terminal 1901 supports the function "V2X over NR PC5", the terminal 1901 may include a V2X over NR PC5 capability indication in the UE 5GMM Core Network Capability. If the terminal 1901 supports both the function "V2X over LTE PC5" and the function "V2X over NR PC5", the terminal 1901 may include both a V2X over LTE PC5 capability indication and a V2X over NR PC5 capability indication in the UE 5GMM Core Network Capability or may include one V2X capability indication indicating that the both functions are supported.

In FIG. 19, the terminal 1901 can connect to the base station ((R)AN) 1903 and register itself in the network. Upon receiving the registration request message from the terminal 1901 at step 1910, the base station 1903 may forward the received registration request message to the AMF 1905 (step 1920). Upon receiving the registration request message, the AMF 1905 can determine whether the base station 1903 to which the terminal 1901 is currently connected is an LTE base station (evolved E-UTRAN or evolved eNB) or an NR base station (NG-RAN or gNB). To determine the base station to which the terminal 1901 is connected, the AMF 1905 may use the information included in the message received at the step 1920 about the type of the access network (AN) (e.g., LTE, NR or non-3GPP) to which the terminal 1901 is connected. Alternatively, when the AMF 1905 makes a connection with the base station 1903, the AMF 1905 can identify whether the base station 1903 is an LTE base station or an NR base station. Hence, based on the base station from which the step 1920 message is received, the AMF 1905 can determine the type of the access network (AN) (e.g., LTE, NR, or non-3GPP) to which the terminal 1901 is connected.

In the UDM 1907 or the UDR 1909, the UE subscription information of the terminal 1901 and the UE capability information supported by the terminal 1901 may be stored. The UE subscription information may include information on the slice (subscribed S-NSSAIs) to which the terminal 1901 has subscribed. The UE capability information supported by the terminal 1901 may include information regarding the RAT type (e.g., LTE or NR) supported by the terminal 1901, the communication scheme (e.g., LTE PC5, NR PC5, or Uu) supported by the terminal 1901, and the service (e.g., V2X over LTE PC5, V2X over NR PC5, or V2X over Uu) supported by the terminal 1901. In addition, the UE-PC5-AMBR value usable in the PC5 communication (e.g., ProSe) of the terminal 1901 may be stored. The UE-PC5-AMBR values may be defined and stored respectively for LTE PC5 and NR PC5 for V2X communication. That is, the values for "UE-PC5-AMBR for V2X over LTE PC5" and "UE-PC5-AMBR for V2X over NR PC5" may be stored. Alternatively, one value for "UE-PC5-AMBR for V2X over PC5" may be stored for V2X communication regardless of the RAT type.

In FIG. 19, the AMF 1905 can send a request for subscription information of the terminal 1901 to the UDM 1907 (step 1930). This UE subscription request message may include the ID'(SUPI) of the terminal 1901 and information on the access network (AN) (LTE, NR or non-3GPP) to which the terminal 1901 is currently connected.

In FIG. 19, upon receiving the UE subscription request message, the UDM 1907 can determine whether the subscription information corresponding to the terminal ID (SUPI) is stored in the UDM 1907. If not stored, the UDM 1907 may send a request for the stored data to the UDR 1909 (step 1940). This request message may include a terminal ID (SUPI) indicating the terminal 1901. This request message may also include an event ID. The event ID may indicate a UE capability information acquisition event of the terminal 1901 or a UE capability authentication event of the terminal 1901. This request message at step 1940 may also include an application ID indicating a V2X service. The UDR 1909 may retrieve the information corresponding to the terminal ID (SUPI) and transmit the retrieved information to the UDM 1907 as a response (step 1950). The response message at step 1950 may include the subscribed S-NSSAIs information of the terminal 1901. Further, based on the event ID or application ID included in the request message of step 1940, the UDR 1909 may determine that the request message is for V2X service authentication and may include information related to the V2X service in the response message of step 1950. The information related to the V2X service may include a UE-PC5-AMBR value usable in the PC5 communication (e.g., ProSe) of the terminal 1901. The UE-PC5-AMBR value may be UE-PC5-AMBR for V2X over LTE PC5 or UE-PC5-AMBR for V2X over NR PC5, or may only be UE-PC5-AMBR for V2X over PC5 regardless of the RAT type. Alternatively, if the request message of step 1940 does not include an event ID or application ID, the UDR 1909 may include all the stored UE capability information in the response message of step 1950 for transmission to the UDM 1907. The UE capability information may include, as the UE-PC5-AMBR, a UE-PC5-AMBR value for V2X over LTE PC5 or a UE-PC5-AMBR value for V2X over NR PC5, or a UE-PC5-AMBR value only for V2X over PC5 regardless of the RAT type.

In FIG. 19, if the subscription information corresponding to the terminal ID (SUPI) is stored in the UDM 1907 having received the UE subscription request message at step 1930, or if the response message of step 1950 is received from the UDR 1909, the UDM 1907 may send a UE subscription response message to the AMF 1905 (step 1960). The UE subscription response message may be include subscribed S-NSSAIs information of the terminal 1901. The UE subscription response message may also include a UE-PC5-AMBR value for V2X communication corresponding to the access network (AN) to which the terminal 1901 is currently connected. For example, if the terminal 1901 is currently connected to the AMF 1905 via the LTE base station (evolved E-UTRAN or evolved eNB), the UE-PC5-AMBR value for V2X over LTE PC5 may be included. If the terminal 1901 is currently connected to the AMF 1905 via the NR base station (NG-RAN or gNB), the UE-PC5-AMBR value for V2X over NR PC5 may be included. Both the UE-PC5-AMBR value for V2X over LTE PC5 and the UE-PC5-AMBR value for V2X over NR PC5 may be included regardless of the access network to which the terminal 1901 is currently connected. Or, if the UE-PC5-AMBR value stored in the UDM 1907 or the UDR 1909 is only one UE-PC5-AMBR value for V2X over PC5 for V2X communication regardless of the RAT type, the UE-PC5-AMBR value for V2X over PC5 may be included.

In FIG. 19, based on the UE subscription information received at step 1960, the AMF 1905 may process the registration request message of the terminal 1901 and determine to accept the registration request of the terminal 1901. The AMF 1905 may transmit a registration accept message indicating successful registration to the terminal 1901 via the base station ((R)AN) 1903 (steps 1970 and 1980). The registration accept message sent from the AMF 1905 to the base station 1903 at step 1970 may include the allowed NSSAI being slice information available to the terminal 1901 or a "V2X services authorized" indication. The registration accept message may also include a terminal ID (e.g., SUPI or 5G-GUTII) indicating the terminal 1901. If the allowed NSSAI included in the registration accept message includes the S-NSSAI for eV2X, or if the registration accept message includes the "V2X services authorized" indication, based on this information, the base station 1903 can recognize that the currently connected terminal 1901, which can be identified by the terminal ID, is an authorized terminal allowed to use the vehicle communication service. In addition, the registration accept message sent from the AMF 1905 to the base station 1903 at step 1970 may include a UE-PC5-AMBR value. For example, only a UE-PC5-AMBR value corresponding to the access network (AN) to which the terminal 1901 is currently connected may be included. If the terminal 1901 is currently connected to the AMF 1905 via the LTE base station (evolved E-UTRAN or evolved eNB), the UE-PC5-AMBR value for V2X over LTE PC5 may be included. If the terminal 1901 is currently connected to the AMF 1905 via the NR base station (NG-RAN or gNB), the UE-PC5-AMBR value for V2X over NR PC5 may be included. Both the UE-PC5-AMBR value for V2X over LTE PC5 and the UE-PC5-AMBR value for V2X over NR PC5 may be included regardless of the access network to which the terminal 1901 is currently connected. Or, only one UE-PC5-AMBR value for V2X over PC5 may be included for V2X communication regardless of the RAT type.

In FIG. 19, upon receiving the registration accept message from the AMF 1905, the base station 1903 may store the information included in the registration accept message. The information of the registration accept message stored by the base station 1903 may include the allowed NSSAI, the "V2X services authorized" indication, the terminal ID, the UE-PC5-AMBR value for V2X over LTE PC5, the UE-PC5-AMBR value for V2X over NR PC5, or the UE-PC5-AMBR value for V2X over PC5.

In FIG. 19, upon receiving the registration accept message at step 1980, the terminal 1901 can identify the available slice information based on the allowed NSSAI included in the registration accept message. If the allowed NSSAI includes the S-NSSAI for eV2X, the terminal 1901 can utilize the vehicle communication service. For example, if the allowed NSSAI includes the S-NSSAI for eV2X, the terminal 1901 can establish a session by including the S-NSSAI for eV2X in the PDU session establishment request message. If the terminal 1901 is connected to the AMF 1905 via an LTE base station (evolved E-UTRAN or evolved NB), the terminal may operate in "not served by NG-RAN" mode, "served by Evolved E-UTRAN" mode, or "served by E-UTRAN" mode. For example, the terminal 1901 may operate in a network scheduled operation mode or an autonomous resources selection mode for LTE PC5 communication. That is, the terminal 1901 operating in the network scheduled operation mode can make a request for resources for the LTE PC5 communication to the base station 1903, and the base station 1903 can allocate resources to the terminal 1901 based on the UE-PC5-AMBR value for V2X over LTE PC5 received from the AMF 1905. The terminal 1901 operating in the autonomous resources selection mode can use the pre-configuration information stored in the terminal 1901 without making a request for resources for LTE PC5 communication to the base station 1903. In addition, the terminal 1901 may operate in the autonomous resources selection mode for NR PC5 communication. That is, the terminal 1901 operating in the autonomous resources selection mode can use the pre-configuration information stored in the terminal 1901 without making a request for resources for NR PC5 communication to the base station 1903. If the terminal 1901 is connected to the AMF 1905 via the NR base station (NG-RAN or gNB), the terminal 1901 may operate in "not provided by Evolved E-UTRAN" mode, "not served by E-UTRAN" mode, or "served by NG-RAN" mode. For example, the terminal 1901 may operate in the network scheduled operation mode or the autonomous resources selection mode for NR PC5 communication. That is, the terminal 1901 operating in the network scheduled operation mode can make a request for resources for the NR PC5 communication to the base station 1903, and the base station 1903 can allocate resources to the terminal 1901 based on the UE-PC5-AMBR value for V2X over NR PC5 received from the AMF 1905. The terminal 1901 operating in the autonomous resources selection mode can use the pre-configuration information stored in the terminal 1901 without making a request for NR PC5 communication to the base station 1903. In addition, the terminal 1901 may operate in the autonomous resources selection mode for LTE PC5 communication. That is, the terminal 1901 operating in the autonomous resources selection mode can use the pre-configuration information stored in the terminal 1901 without making a request for resources for LTE PC5 communication to the base station 1903.

In FIG. 19, if the S-NSSAI for eV2X is not included in the allowed NSSAI of the registration accept message received at step 1980, the terminal 1901 may be unable to make a PDU session request for the V2X service. For example, the terminal 1901 cannot include an S-NSSAI for eV2X in the PDU session establishment request message to be sent. The terminal 1901 may also be unable to operate in the network scheduled operation mode for LTE PC5 or NR PC5 communication. However, the terminal 1901 may operate in the autonomous resources selection mode for LTE PC5 or NR PC5 communication.

Figure 20:
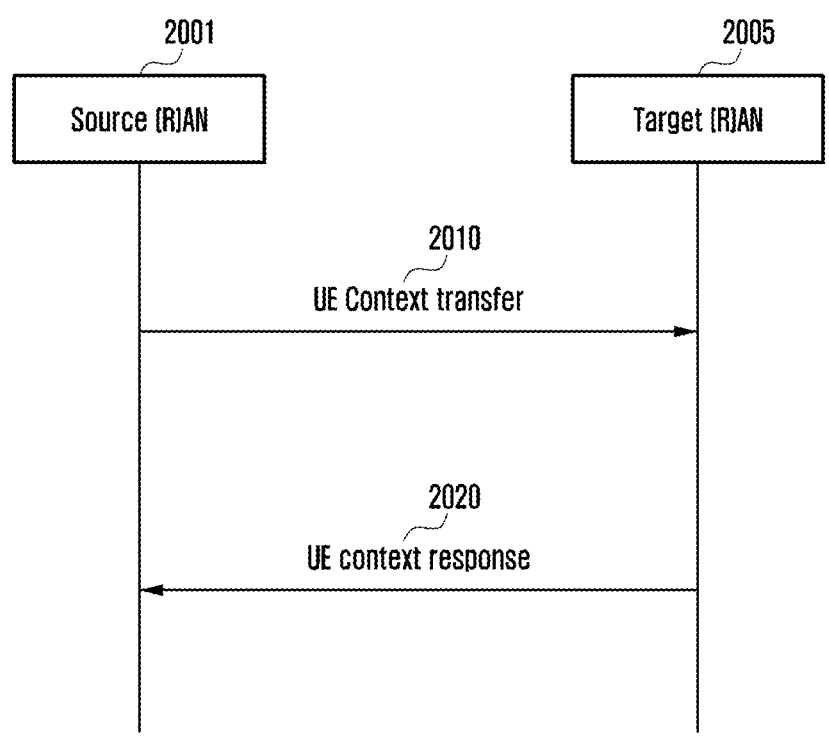
FIG. 20 illustrates information transferred from the source base station to the target base station when the terminal moves between base stations according to an embodiment of the disclosure.

FIG. 20 illustrates information transferred from the source base station to the target base station when the terminal moves between base stations according to an embodiment of the disclosure.

In FIG. 20, the source (R)AN 2001 indicates a base station to which the terminal is currently connected. The source (R)AN 2001 stores the information received from the AMF 1805 (at step 1870 of FIG. 18) as UE context. The UE context may include information on the current PC5 mode (network scheduled operation mode or autonomous resources selection mode) for each RAT type. For example, when the source (R)AN 2001 is an NR base station (NG-RAN or gNB), the PC5 mode of the terminal may be the autonomous resources selection mode for the LTE RAT and may be the network scheduled operation mode for the NR RAT, and this information may be stored in the source (R)AN 2001 as the UE context. When the terminal performs a handover from the source (R)AN 2001 to the target (R)AN 2005, the source (R)AN 2001 2001 may transfer the UE context information to the target (R)AN 2005 (step 2010). Then, the target (R)AN 2005 may transmit a UE context response message to the source (R)AN 2001 (step 2020).

Figure 21:
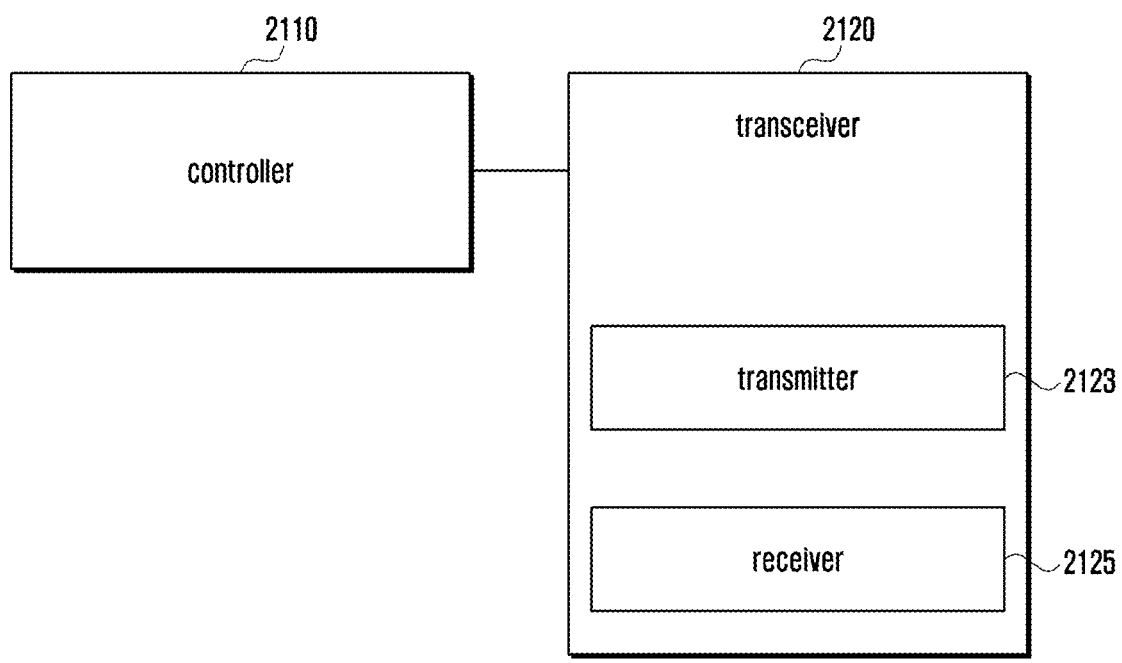
FIG. 21 is a block diagram of a terminal according to the disclosure.

FIG. 21 is a block diagram of a terminal according to the disclosure.

The terminal according to an embodiment of the disclosure may include a transceiver 2120, and a controller 2110 for controlling the overall operation of the terminal. The transceiver 2120 may include a transmitter 2123 and a receiver 2125.

The transceiver 2120 can send and receive signals to and from other network entities.

The controller 2110 may control the terminal to perform operations according to one of the above-described embodiments. Meanwhile, the controller 2110 and the transceiver 2120 do not necessarily have to be implemented as separate modules, but may be implemented as a single module like a single chip. The controller 2110 and the transceiver 2120 may be electrically connected. For example, the controller 2110 may be a circuit, an application-specific circuit, or at least one processor. In addition, the operations of the terminal can be realized by providing a memory storing the corresponding program codes in a specific component of the terminal.

Figure 22:
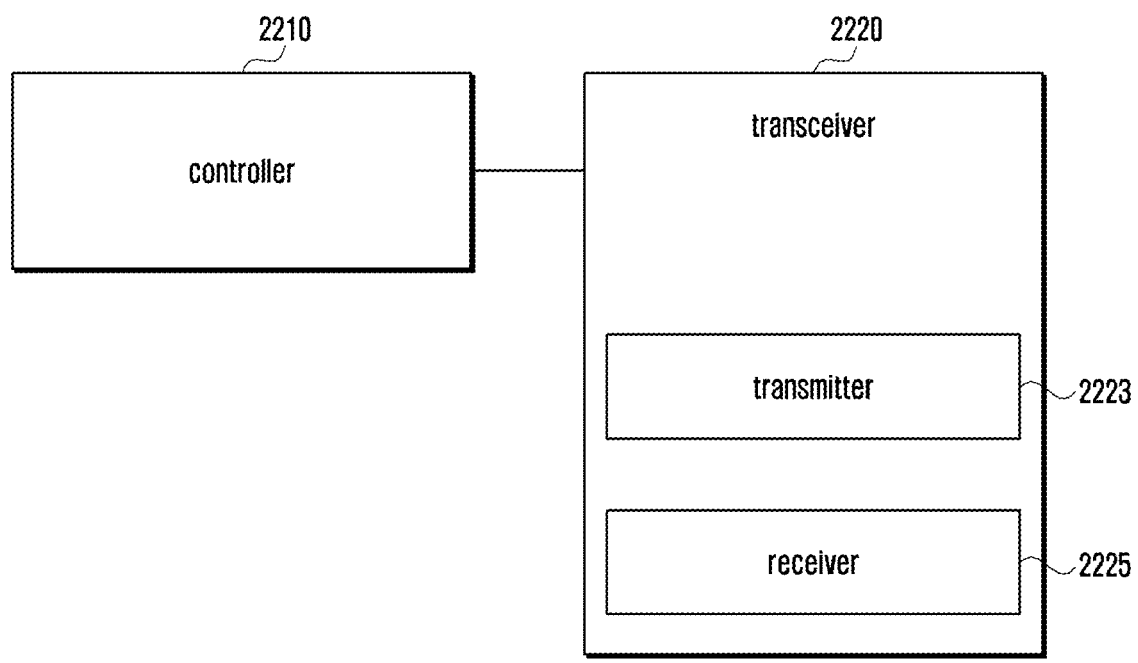
FIG. 22 is a block diagram of a network entity according to the disclosure.

FIG. 22 is a block diagram of a network entity according to the disclosure.

The network entity according to an embodiment of the disclosure may include a transceiver 2220; and a controller 2210 for controlling the overall operation of the network entity. The transceiver 2220 may include a transmitter 2223 and a receiver 2225.

The transceiver 2220 can send and receive signals to and from other network entities.

The controller 2210 may control the network entity to perform operations according to one of the above-described embodiments. Meanwhile, the controller 2210 and the transceiver 2220 do not necessarily have to be implemented as separate modules, but may be implemented as a single module like a single chip. The controller 2210 and the transceiver 2220 may be electrically connected. For example, the controller 2210 may be a circuit, an application-specific circuit, or at least one processor. In addition, the operations of the network entity can be realized by providing a memory storing the corresponding program codes in a specific component of the network entity.

It should be noted that structure diagrams, diagrams illustrating a control/data signal transmission method, operational procedures, and block diagrams depicted in FIGS. 1 to 22 are not intended to limit the scope of the disclosure. In other words, all the components, entities, or operations described above in FIGS. 1 to 21 should not be construed as being essential for the practice of the disclosure, and some of them may be sufficient to practice the disclosure without departing from the spirit of the disclosure.

The above-described operations of the base station or terminal can be realized by providing a memory storing the corresponding program codes in a specific component of the base station or terminal. That is, the controller of the base station or terminal can perform the above-described operations by causing a processor or CPU (central processing unit) to read and execute the program codes stored in the memory.

The various components and modules of the entity, base station or terminal described herein may be realized or operated by using hardware (e.g. complementary-metal-oxide-semiconductor based logic circuit), firmware, software, or software embedded in a machine readable medium, or any combination thereof. For example, various electrical structures and methods may be realized by using electrical circuits such as transistors, logic gates, or application specific integrated circuits.

While the disclosure has been shown and described with reference to various embodiments thereof, it should be understood by those skilled in the art that many variations and modifications of the method and apparatus described herein will still fall within the spirit and scope of the disclosure as defined in the appended claims and their equivalents.

What is claimed is:

1. A method performed by a terminal in a wireless communication system, the method comprising:

receiving, from an access and mobility management function (AMF), a user equipment (UE) configuration update message including mapping information received from a policy control function (PCF) based on a UE policy update being triggered by the PCF, the mapping information for mapping between at least one vehicle to everything (V2X) service type and at least one radio access technology (RAT) type;

selecting at least one RAT type corresponding to a V2X message to be transmitted, based on the mapping information; and transmitting the V2X message using the selected at least one RAT type, wherein the selecting the at least one RAT type is performed by a V2X layer of the terminal.

2. The method of claim 1, wherein the transmitting the V2X message comprises:

transmitting the V2X message using at least one of a long term evolution (LTE) RAT or a next generation (NR)

RAT, in case that the selected at least one RAT type corresponding to the V2X message is the LTE RAT and the NR RAT.

3. The method of claim 1, wherein the receiving the mapping information comprises:
transmitting, to the AMF, a request message; and
receiving, from the AMF, a response message including the mapping information received from the PCF stored in a user data repository (UDR), as a response to the request message.

4. A method performed by an access and mobility management function (AMF) in a wireless communication system, the method comprising:
receiving, from a policy control function (PCF), a user equipment (UE) configuration update message including mapping information based on a UE policy update being triggered by the PCF, the mapping information for mapping between at least one vehicle to everything (V2X) service type and at least one radio access technology (RAT) type; and
transmitting, to a terminal, the mapping information for the terminal to select at least one RAT type corresponding to a V2X message to be transmitted and to transmit the V2X message using the selected at least one RAT type,
wherein the at least one RAT type is selected by a V2X layer of the terminal.

5. The method of claim 4, wherein the receiving the mapping information comprises:
receiving, from the terminal, a request message;
transmitting, to the PCF, a policy request message; and
receiving, from the PCF, a policy response message including the mapping information received from a user data repository (UDR),
wherein the transmitting the mapping information comprises transmitting, to the terminal, a response message including the mapping information.

6. The method of claim 4,
wherein the transmitting the mapping information comprises transmitting, to the terminal, the UE configuration update message including the mapping information.

7. A terminal in a wireless communication system, the terminal comprising:
a transceiver; and
a controller configured to:
receive, from an access and mobility management function (AMF) via the transceiver, a user equipment (UE) configuration update message including mapping information received from a policy control function (PCF) based on a UE policy update being triggered by the PCF, the mapping information for mapping between at least one vehicle to everything (V2X) service type and at least one radio access technology (RAT) type,
select at least one RAT type corresponding to a V2X message to be transmitted, based on the mapping information, and
transmit, via the transceiver, the V2X message using the selected at least one RAT type,
wherein the at least one RAT type is selected by a V2X layer of the terminal.

8. The terminal of claim 7, wherein the controller is configured to transmit, via the transceiver, the V2X message using at least one of a long term evolution (LTE) RAT or a next generation (NR) RAT, in case that the selected at least one RAT type corresponding to the V2X message is the LTE RAT and the NR RAT.

9. The terminal of claim 7, wherein the controller is configured to:
transmit, to the AMF via the transceiver, a request message, and receive, from the AMF, a response message including the mapping information received from the PCF stored in a user data repository (UDR), as a response to the request message.

10. An access and mobility management function (AMF) in a wireless communication system, the AMF comprising:
a transceiver; and
a controller configured to:
receive, from a policy control function (PCF) via the transceiver, a user equipment (UE) configuration update message including mapping information based on a UE policy update being triggered by the PCF, the mapping information for mapping between at least one vehicle to everything (V2X) service type and at least one radio access technology (RAT) type, and
transmit, to a terminal via the transceiver, the mapping information for the terminal to select at least one RAT type corresponding to a V2X message to be transmitted and to transmit the V2X message using the selected at least one RAT type,
wherein the at least one RAT type is selected by a V2X layer of the terminal.

11. The AMF of claim 10, wherein the controller is configured to receive, from the terminal via the transceiver, a request message, transmit, to the PCF, a policy request message, and receive, from the PCF, a policy response message including the mapping information received from a user data repository (UDR), and
wherein the controller is configured to transmit, to the terminal via the transceiver, a response message including the mapping information.

12. The AMF of claim 10,
wherein the controller is configured to transmit, to the terminal via the transceiver, the UE configuration update message including the mapping information.

* * * * *